(12) United States Patent
Barton

(10) Patent No.: US 8,467,606 B2
(45) Date of Patent: Jun. 18, 2013

(54) METHOD FOR SEGMENTING A COMPOSITE IMAGE

(75) Inventor: Mark A. Barton, Virginia Beach, VA (US)

(73) Assignee: Eastman Kodak Company, Rochester, NY (US)

( * ) Notice: Subject to any disclaimer, the term of this patent is extended or adjusted under 35 U.S.C. 154(b) by 117 days.

(21) Appl. No.: 13/217,376

(22) Filed: Aug. 25, 2011

(65) Prior Publication Data

US 2013/0051671 A1  Feb. 28, 2013

(51) Int. Cl.
*G06K 9/34* (2006.01)

(52) U.S. Cl.
USPC ............................. 382/173; 382/203

(58) Field of Classification Search
USPC .............. 382/173, 199, 202, 203, 281, 286, 382/288
See application file for complete search history.

(56) References Cited

U.S. PATENT DOCUMENTS

| | | | |
|---|---|---|---|
| 6,298,157 B1 * | 10/2001 | Wilensky | 382/199 |
| 7,020,352 B2 | 3/2006 | O'Callaghan et al. | |
| 7,894,675 B2 * | 2/2011 | Wiedemann et al. | 382/199 |
| 8,155,445 B2 * | 4/2012 | Kanatsu | 382/176 |
| 2006/0114518 A1 | 6/2006 | King | |
| 2007/0116362 A1 | 5/2007 | Tiede | |
| 2010/0201682 A1 * | 8/2010 | Quan et al. | 345/419 |

FOREIGN PATENT DOCUMENTS

EP  1 944 731  7/2008

OTHER PUBLICATIONS

Oh et al: "Segmentation of cylindrical parts stored in a bin", Microprocessing and Microprogramming, Elsevier Science Publishers, DV., Amsterdam, NL, vol. 33, No. 5, Aug. 1, 1992, pp. 289,298, XP 026648492, ISSN: 0165-6074, DOI: 10.1016/0165-6074(92)90011-U [retrieved on Aug. 1, 1992] pp. 291-293; figures 1-6.

* cited by examiner

*Primary Examiner* — Phuoc Tran
(74) *Attorney, Agent, or Firm* — Kevin E. Spaulding

(57) ABSTRACT

A method for segmenting a composite image containing a plurality of individual images, comprising: locating line segments corresponding to edges in a composite image; defining a plurality of candidate rectangles by identifying sets of four line segments having a first pair of line segments that are parallel to and a second pair of line segments that are perpendicular to the first pair of line segments; identifying image regions that are more than a predefined isolation distance from any of the line segments; identifying a set of enclosing rectangles from among the candidate rectangles for each of the identified image regions; selecting a rectangle for each of the identified image regions from the corresponding set of enclosing rectangles by applying geometric constraints; forming a plurality of sub-images from the composite image by extracting the digital image data corresponding to the selected rectangles; and; and storing the sub-images in a processor-accessible memory.

22 Claims, 19 Drawing Sheets

METHOD FOR SEGMENTING A COMPOSITE IMAGE

FIELD OF THE INVENTION

This invention pertains to the field of digital image processing and more particularly to a method for segmenting a composite image containing a plurality of individual images.

BACKGROUND OF THE INVENTION

It is frequently desirable to scan hardcopy photographs to produce corresponding digital images. A wide variety of digital scanners have been developed for this purpose and are widely available in many different forms, including scanner modules included in all-in-one printers.

Scanners are frequently used to scan composite images that include two or more individual images such as a photographic album page, a scrapbook page, a photo collage or a page of a printed publication. Users often desire to segment the scanned composite image into its individual images.

Many scanner user interfaces allow users to indicate a rectangular area of a composite image that they would like to scan. However, a disadvantage to this approach is that it requires users to manually perform multiple scan operations if they want to scan all of the individual images.

Alternately, image editing applications such as Adobe Photoshop can be used to edit the composite image, manually selecting each of the individual images and saving them as individual image files. However, this requires special software that many users do not own. Additionally, it can be a very time-consuming process that is frustrating to the user.

Recently some scanners have started to include automatic photo segmentation algorithms that attempt to automatically segment a composite image into its component individual images. For example, many Kodak inkjet printers, such as the KODAK ESP 5250 All-in-One Printer, include this capability. These image segmentation algorithms typically assume that the composite image is composed of a set of individual images on a white or black background. They generally identify the borders of the individual work by identifying rectangles that contain content that does not match the expected background region. Such algorithms are typically not robust for composite images having backgrounds with other colors and textures. They also typically need to make assumptions about the number and size of the individual images that make up the composite image.

U.S. Pat. No. 7,020,352 to O'Callaghan et al., entitled "Photo extraction techniques," discloses a photo extraction technique that includes scanning film within a holder. The scanned image is analyzed to detect edge segments for an image-holding area corresponding to the borders holder. The image-holding area is then extracted from the scanned image.

U.S. Patent Application Publication 2006/0114518 to King, entitled "Photographic data conversion method and apparatus," discloses a method to convert various photographs from a photographic album to digital form. In some embodiments, an edge-detection algorithm is used to detect the borders of the individual photographs in a scanned album page.

U.S. Patent Application Publication 2007/0116362 to Tiede, entitled "Method and device for the structural analysis of a document," discloses a method in which a document is broken down into elementary structural units. Individual objects are produced based on the elementary structural units.

There remains a need for a robust and efficient method to segment a composite image into a plurality of individual images.

SUMMARY OF THE INVENTION

The present invention represents a method for segmenting a composite image containing a plurality of individual images, comprising:

receiving digital image data representing the composite image;

using a data processor to locate line segments corresponding to edges in the composite image;

defining a plurality of candidate rectangles by identifying sets of four line segments having a first pair of line segments that are parallel to within a predefined tolerance and a second pair of line segments that are perpendicular to the first pair of line segments to within a predefined tolerance;

identifying image regions that are more than a predefined isolation distance from any of the line segments or that are more than a predefined isolation distance from the any of the candidate rectangles;

identifying a set of enclosing rectangles from among the candidate rectangles for each of the identified image regions;

selecting a rectangle for each of the identified image regions from the corresponding set of enclosing rectangles by applying geometric constraints;

forming a plurality of sub-images from the composite image by extracting the digital image data corresponding to the selected rectangles; and storing the sub-images in a processor-accessible memory.

This invention has the advantage that the performance of the segmentation method is robust for composite images having backgrounds with a wide variety of colors and textures.

It has the additional advantage that the performance of the segmentation method is robust for composite images that include individual images having a wide variety of image content.

It has the further advantage that the performance of the segmentation method is insensitive to the number and size of the individual images that comprise the composite image.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
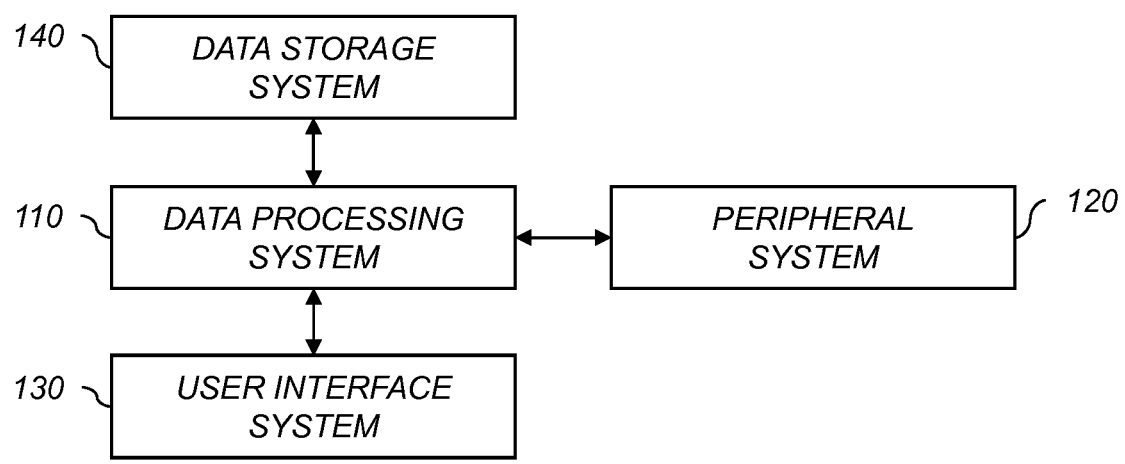
FIG. 1 is a high-level diagram showing the components of a system for segmenting a composite image containing a plurality of individual images according to an embodiment of the present invention.

FIG. 1 is a high-level diagram showing the components of a system for segmenting a composite image according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The object of the present invention is to provide an improved photo segmentation algorithm for segmenting a composite image containing a plurality of individual images into its component parts. Photo segmentation algorithms seek to locate rectangular photographs within a composite image such as a scan of an album page. The photo segmentation algorithm described herein has the advantage that its performance is largely unaffected by the color or texture of the background of the composite image, the image content found in the individual images, and the number and size of the individual images that are included in the the composite image.

The present invention will now be described with reference to FIG. 2. The input to the process is a composite image 200. In a preferred embodiment, the composite image 200 is a scan of a hardcopy original that includes a plurality of individual photographic images. For example, the hardcopy original can be a photographic album page, a scrapbook page, a photo collage or a page of a printed publication. In some cases, the composite image 200 can be a scan of a set of independent individual images that were arranged on a scanner platen. For the case where the composite image 200 is a scan of a hardcopy original, the composite image can be received directly from a digital scanner. Alternately, the composite image 200 can be stored in a digital image file on a digital storage medium (e.g., a hard disk or a solid state memory) which can be accessed at a later time. In this case, the composite image 200 is received from the digital storage medium that was used to store the digital image file. In some cases, the individual images in the composite image 200 may include one or more non-photographic images. For example, the individual images can include artwork or computer generated graphics.

In other embodiments, the composite image 200 can be a digitally created composite image. The digitally created composite image can be formed using any method known in the art. For example, many photo editing software applications offer an option for a user to create a composite image 200 by combining a plurality of individual image files. The resulting digitally created composite image can then be stored as a composite image file using any arbitrary digital image format supported by the photo editing software application. The method of the present invention can be used to process the resulting digitally created composite image stored in the composite image file to extract the individual images from the composite image file.

Figure 3:
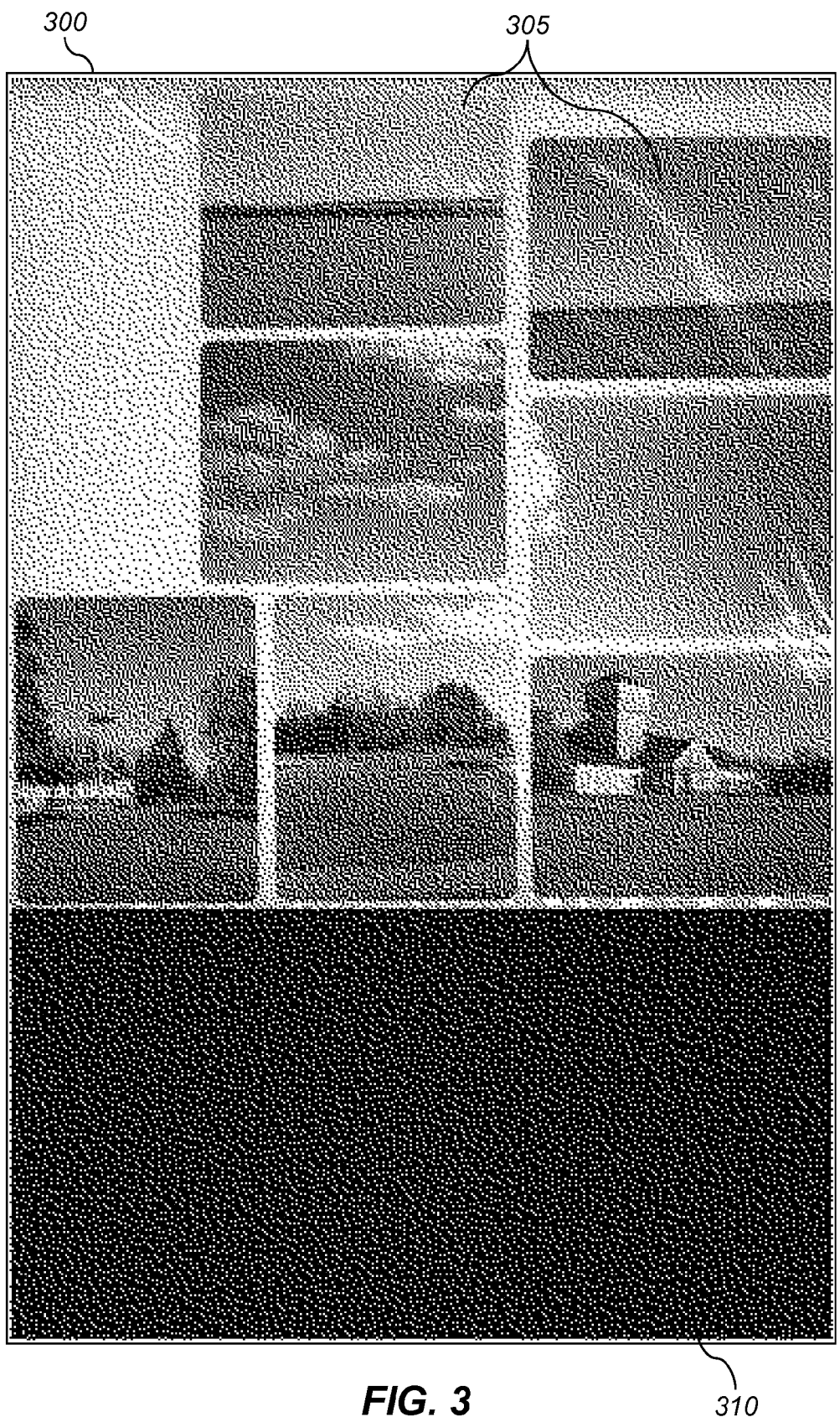
FIG. 3 shows an example of a scanned photo album page.

FIG. 3 shows an example of a scanned photo album page 300 containing seven individual image 305. Note that for illustration purposes the scanned photo album page 300 is shown using a black-and-white representation; however, the scanned photo album page 300 will typically be a continuous-tone color image.

The scanned photo album page 300 will typically be a color image scanned at a resolution of between 150-600 dpi. However, to improve the speed of the remaining processing steps, a resizing operation is preferably applied to the scanned photo album page 300 to reduce the resolution to 100 dpi. In addition to improving the speed of the processing, it also eliminates variations in performance with input image resolution since the rest of the algorithm always operates on the same resolution of the image. In a preferred embodiment, the reduced-resolution image is also converted to grayscale to further improve the processing speed, although this step is not strictly necessary.

While the reduced-resolution grayscale image is used for the subsequent processing steps, the full-resolution color image is retained as well for later use. After the locations of the individual image 305 have been determined according to the method of the present invention, sub-images can be extracted from the corresponding locations in the full-resolution color image.

Figure 4:
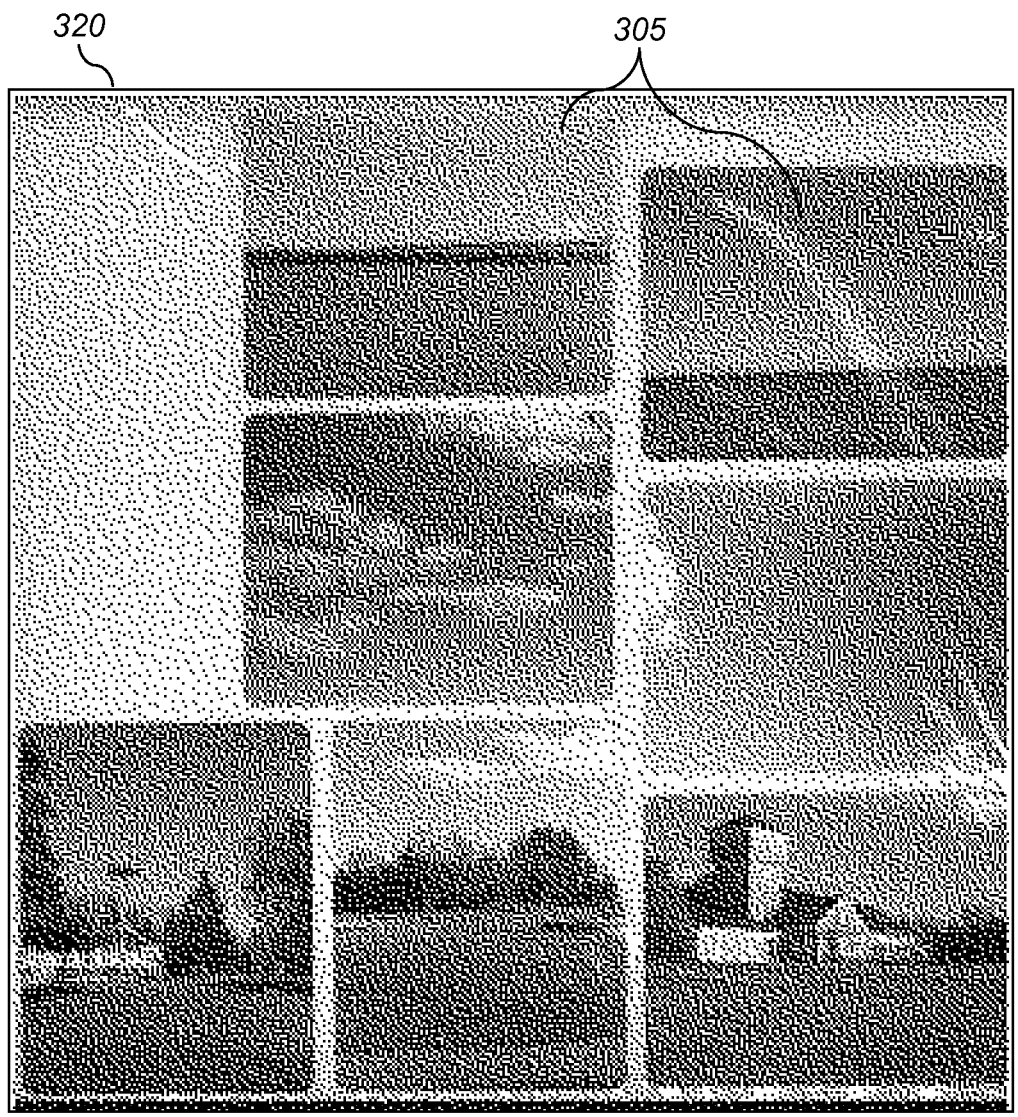
FIG. 4 shows an example of a cropped scanned photo album page.

The scanned photo album page 300 shown in FIG. 3 is an un-cropped scan spanning the entire platen of the scanner. Such scans typically include a border region 310 around the perimeter where the scan extended beyond the dimensions of the actual photo album page being scanned. In this example, the background region 310 is black, although in other cases it may be some other color (e.g., white or gray) corresponding to the color of the scanner backing surface. To simplify the remaining processing, a crop operation can be applied to remove as much of the border region as possible, without cropping any of the actual photo album page area. Any method for cropping off border regions known in the art can be used in accordance with the present invention. Such methods typically make use of a priori knowledge regarding the color of the scanner backing surface to identify the smallest rectangle that encloses actual image content. FIG. 4 shows an example of a cropped scanned photo album page 320 that can be used for the composite image 200 (FIG. 2) in accordance with the present invention.

Figure 2:
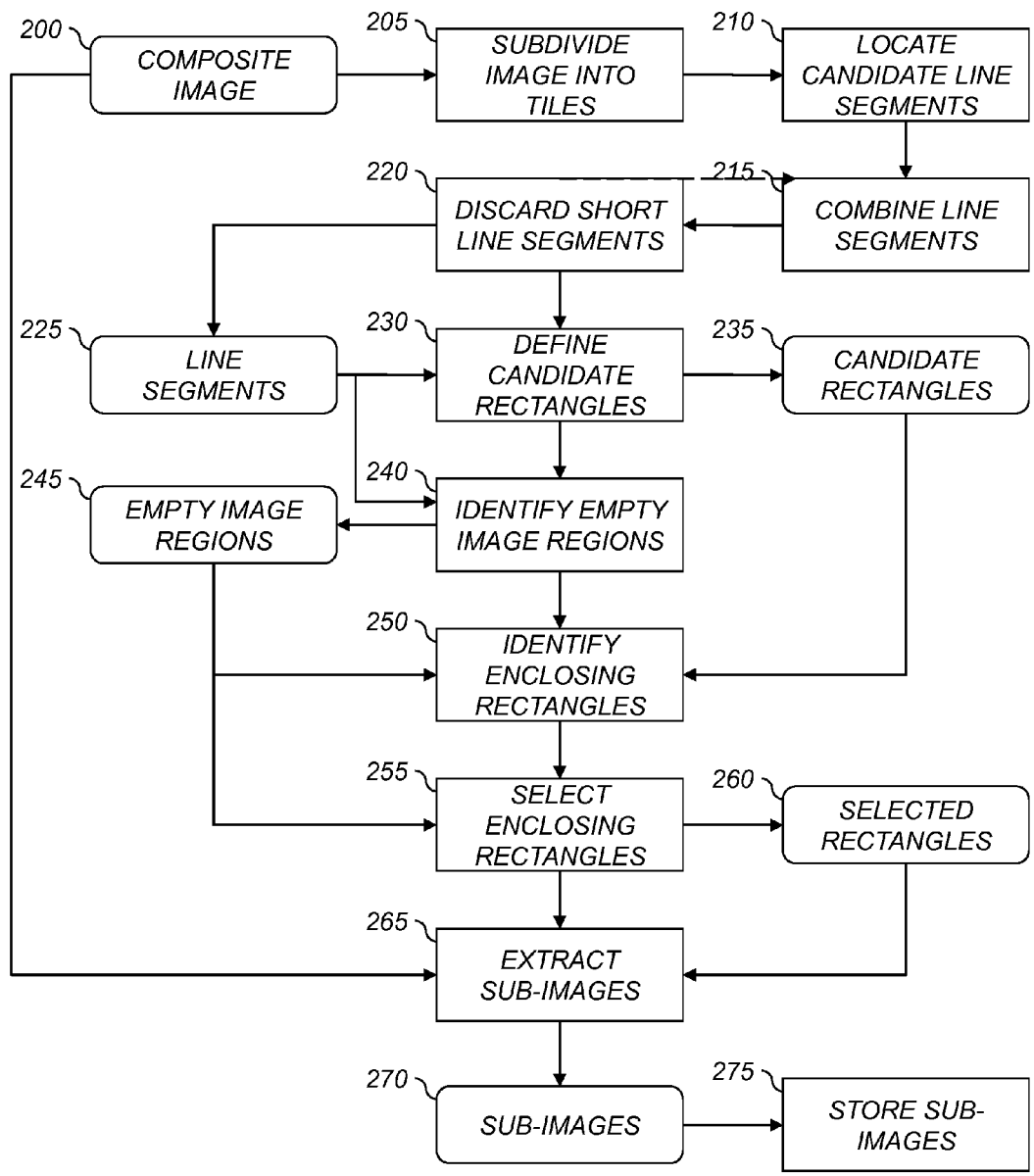
FIG. 2 is flowchart showing a method for segmenting a composite image containing a plurality of individual images according to an embodiment of the present invention.

Returning to a discussion of FIG. 2, a subdivide image into tiles step 205 is used to subdivide the composite image 200 into a plurality of image tiles. The purpose of forming the image tiles is to enable line segments corresponding to edges in the composite image 200 to be conveniently identified. Generally, the size of the image tiles should be chosen such that edges in the composite image 200 are likely to extend all the way across the image tiles, but will not be obscured by surrounding clutter. In a preferred embodiment, the image tiles are formed by subdividing the composite image 200 into a lattice of ¼ inch squares. However, good results can be obtained using smaller or larger tile sizes as well. It should be noted that subdivision of the composite image 200 into the image tiles will generally be a virtual process where the tile dimensions and locations are defined; it is not generally necessary to actually break the composite image 200 down into individual image tiles that are stored independently in memory.

A locate candidate line segments step 210 is then used to locate candidate line segments within the image tiles corresponding to edges in the composite image 200. Edges in the composite image 200 can be identified using any method known in the art. In a preferred embodiment, the edges are located by processing the composite image 200 using a pair of gradient operators (i.e., convolution filters), one for detecting vertical edges, the other for detecting horizontal edges. In other embodiments, other edge detection operators such as the well-known Sobell, Roberts Cross or Prewitt gradient operators can be used to locate the edges. The gradient operators used in the preferred embodiment have the form:

$$G_H = [\,+1 \quad -1\,] \text{ and } G_V = \begin{bmatrix} +1 \\ -1 \end{bmatrix} \qquad (1)$$

where the horizontal gradient operator $G_H$ computes a horizontal gradient image, and the vertical gradient operator $G_V$ computes a vertical gradient image. In a preferred embodiment, an absolute value operation is applied to the gradient images after convolving the composite image 200 with the gradient operators to provide all positive gradient images.

Figure 5:
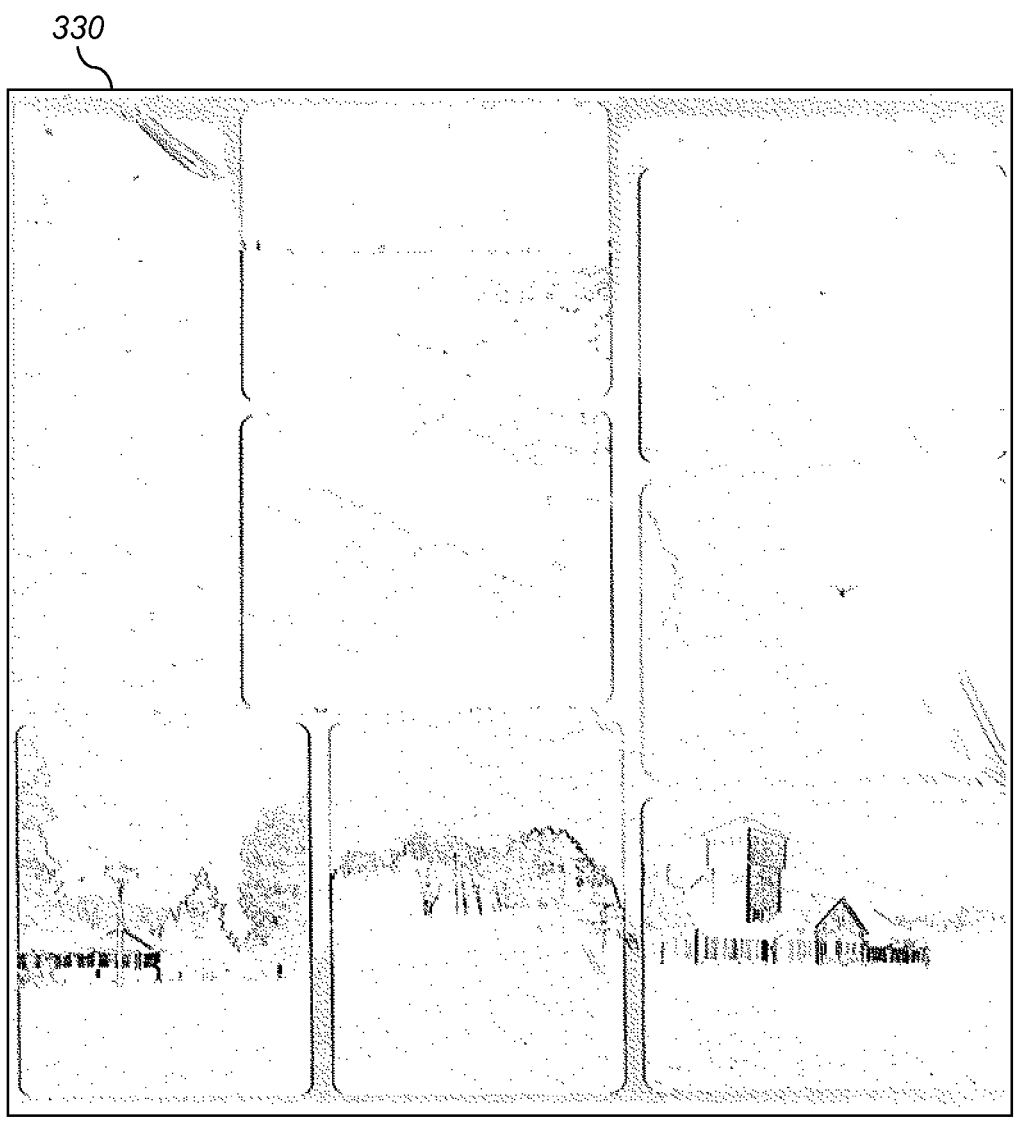
FIG. 5 shows a horizontal gradient image corresponding to the cropped scanned photo album page of FIG. 4.
Figure 6:
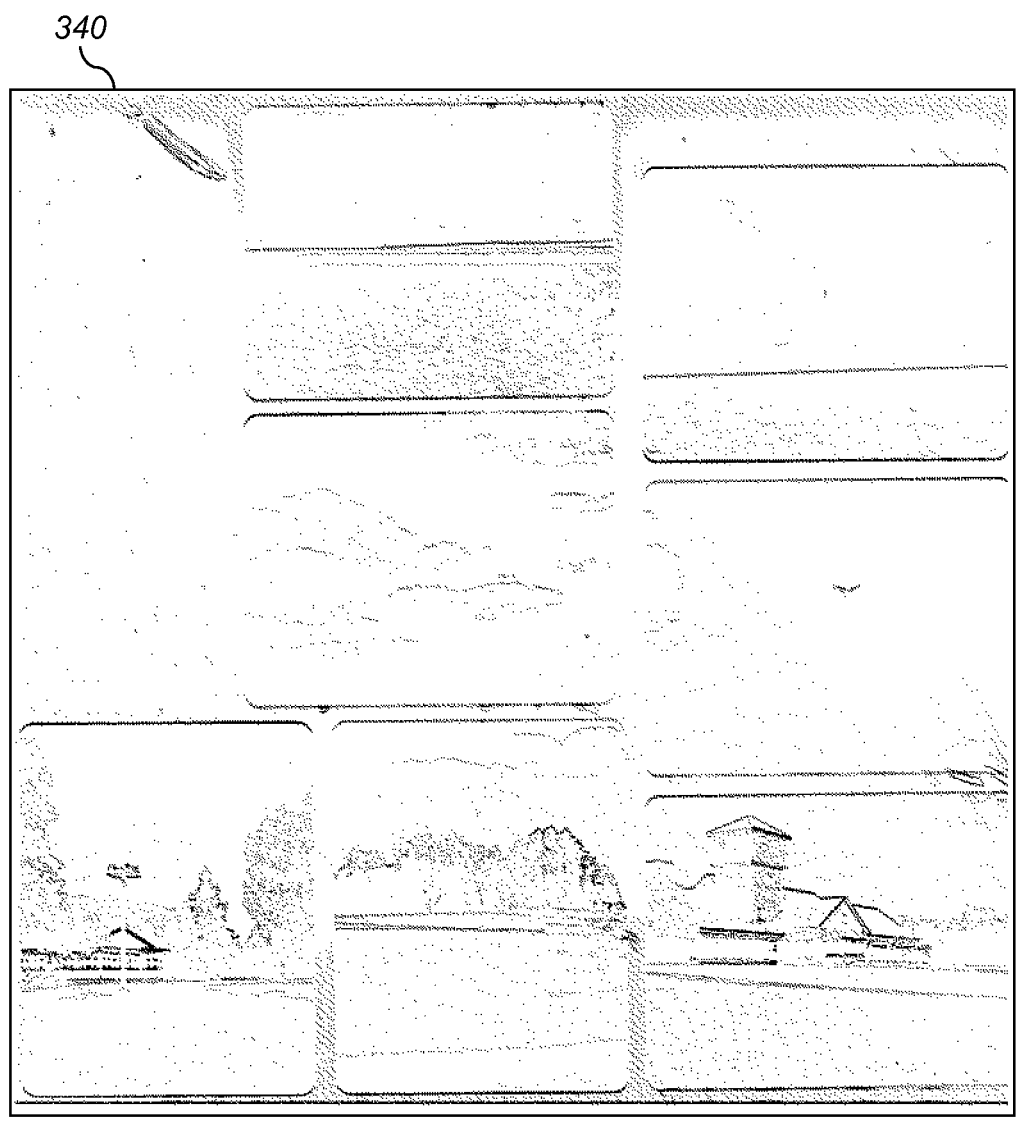
FIG. 6 shows a vertical gradient image corresponding to the cropped scanned photo album page of FIG. 4.

The horizontal and vertical gradient operators of Eq. (1) were applied to the cropped scanned photo album page 320 of FIG. 4. The resulting horizontal gradient image 330 and vertical gradient image 340 are shown in FIG. 5 and FIG. 6, respectively. Notice that vertical edges in the cropped scanned photo album page 320 have a high gradient magnitude in the horizontal gradient image 330, and horizontal edges in the cropped scanned photo album page 320 have a high gradient magnitude in the vertical gradient image 340.

When the input is in grayscale, the gradient operators are applied directly to the grayscale pixel data to form the gradient images. When the input image is a color image in an RGB color space, the image is preferably transformed to a luma-chroma color space, such as the LST color space, before applying the gradient operators. The RGB color values can be converted to corresponding LST color values using the following transformation:

$$L=R+G+B$$
$$S=R-B \quad (2)$$
$$T=R-2G+B$$

The gradient operators of Eq. (1) can be generalized to be applied to the LST color values by using the following equation:

$$\text{Gradient}=|L_1-L_2|+|S_1-S_2|+|T_1-T_2| \quad (3)$$

where the "1" subscript corresponds to the LST values of the pixel corresponding to the "+1" filter coefficient and the "2" subscript corresponds to the LST values of the pixel corresponding to the "−1" filter coefficient.

The horizontal and vertical gradient images can be used by the candidate line segments step 210 to identify candidate line segments in the image tiles of the composite image. The line segments can be identified using various different methods. In a preferred embodiment, the line segments are identified using a form of the well-known Hough transform. According to this approach, line segments in a particular tile of the composite image 200 are located by applying the Hough transforms to the corresponding tiles of the horizontal and vertical gradient images. The horizontal gradient image is used to locate near vertical lines, and the vertical gradient image is used to locate near horizontal lines. The Hough transform is used to provide the slope and intercept for any line segments spanning the image tile.

In one embodiment, the Hough transform is applied by computing linear projections along projection lines at a series of projection angles, integrating the pixels falling along projection lines to produce projection traces. Preferably, projection angles in a predefined angle range (e.g., ±25°) around the vertical direction are used to analyze the horizontal gradient image in order to identify near vertical line segments, and projection angles in the same predefined range around the horizontal direction are used to analyze the vertical gradient image in order to identify near horizontal line segments. The predefined angle range is subdivided into a finite set of projection angles at which the linear projections are determined. In a preferred embodiment, 101 different projection angles separated by 0.5° are used. However, the number of different projection angles can be smaller or larger than this in other implementations.

The projection traces at each projection angle are analyzed to identify the tallest peak (having a height $H_p$). The width of the tallest peak ($W_p$) is then found by determining the width at a predetermined fraction (e.g., ⅓) of the peak height. A quality factor Qp for the peak is then computed by:

$$Qp=H_p/W_p \quad (4)$$

The optimal projection angle providing the largest quality factor is determined and used to define the slope of the line segment. The location of the projection line corresponding to the peak quality factor is used to determine the intercept of the line segment. If the largest quality factor is less than a predefined threshold, then no line segment is located for that tile. In some embodiments, if there is more than one peak having a quality factor that exceeds the predefined threshold, then all of the corresponding line segments are retained for that image tile. The near vertical line segments determined by analyzing the tiles in the horizontal gradient image and the near horizontal line segments determined by analyzing the vertical gradient image can be merged to form a combined set of line segments.

In an alternate embodiment, the locate candidate line segments step 210 utilizes a modified K-means classifier to identify the line segments in each image tile. K-means classifiers are well-known in the art and are used to adaptively cluster a set of points. In this case, the method is adapted to cluster points around a set of line segments. In one implementation, an initial set of line segments (either horizontal or vertical) are distributed across the image tile for the corresponding vertical or horizontal gradient image. The pixels in the image tile for the gradient image are then assigned to the closest line segment. Modified line segments are then determined by fitting the best lines (slope and intercept) to the points assigned to the corresponding line segments, where the pixels are weighted according to the magnitude of the gradient. The pixels in the image tile for the gradient image are then reassigned to the set of modified line segments, and the process is repeated until it converges. Any modified line segments that do not have any pixels assigned to them and any modified line segments having a poor fit are discarded, and the remaining line segments are retained.

Both of the disclosed embodiments of the locate candidate line segments step 210 have been found to produce good results, with the K-means classifier approach being faster. However, the Hough transform approach has the advantage that it can be adapted to locate steps in the projection traces as well as peaks. Since certain image content has been found to produce projection traces having steps at the location of edges in the composite image, the Hough transform technique produces superior results for these cases. For example, consider the case where the composite image 300 includes a background with a texture in it adjacent to a photograph having a flat or low gradient interior. The background will have a large gradient amplitude at all angles due to the texture, while the photo will not. Thus, the projection histogram will have a step at the edge of the photo, rather than a spike. To more robustly handle cases like this, the Hough transform approach is used for the preferred embodiment.

Both the Hough transform and K-means classifier techniques suffer from a common limitation. This limitation is that the line segments being sought must extend over a large percentage of the image tile area being searched in order to be detected, or must be isolated in an image region that does not contain a lot of other image content. Otherwise, the other image content will pollute the gradient data associated with the line segment and make detection of it either inaccurate or impossible. This is one of the primary reasons that the subdivide image into tiles step 305 is used to subdivide the composite image 200 into relatively small image tiles. Line segments are searched for in the individual image tiles so that any significant line in the composite image 200 is likely to extend all the way across the image tile (and beyond), and not be obscured by any surrounding clutter. Photographs are typically smaller than the entire album page image. As a result, the line segments that represent photograph edges may not be distinguishable if the entire composite image 200 is considered all at once. This is because other content in the composite image 200 can obscure the fit of the line segments being sought. In other words, everything that's not part of the line pollutes the fit of the data to an idealized line segment, making it harder to identify or isolate the line segments. When the image tiles approach is used, the important line segments will produce more distinct peaks in the projection trace, and the remaining image content will simply produce a noisy cluttered "floor" surrounding the peak. It has been found that ¼ inch square image tiles produce good results because any line segment shorter than this size is insignificant.

Each of the line segments will have a start point and an end point, as well as the slope and intercept values. In a preferred embodiment, the start and end point are simply set to the locations where the line, as specified by the slope and intercept, cross the edges of the corresponding image tile. This assumes that the identified line segment extends all the way across the image tile, and does not start/end somewhere in the middle. This will be a valid assumption for most line segments, except for those spanning the end of a line. However, even when a line actually does begin or end mid-tile, it has been found that this approximation does not impact performance of the overall algorithm. This is because the extended line segments are only slight misrepresentations, and the subsequent processing steps are designed to tolerate this approximation.

Figure 7:
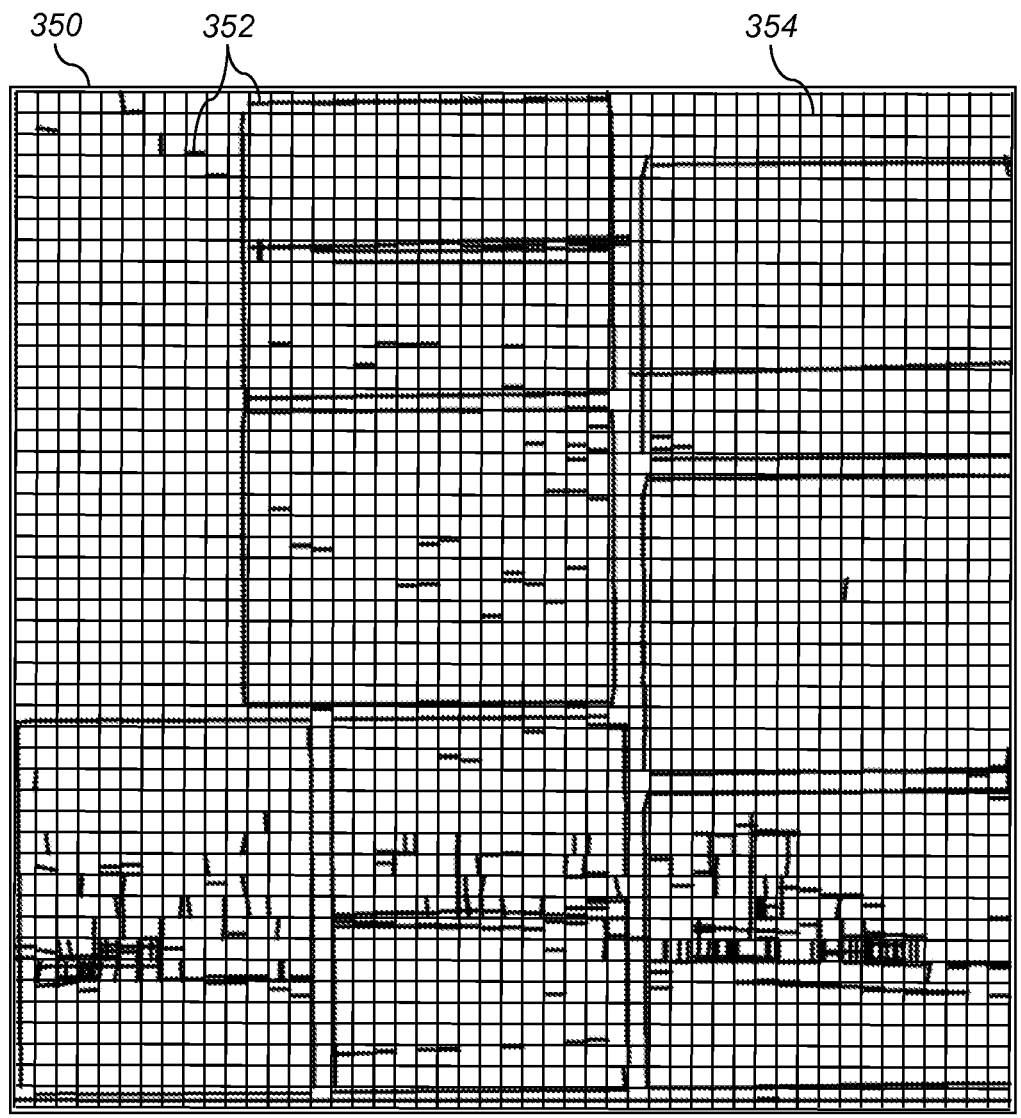
FIGS. 7 and 8 show line segment images corresponding to the cropped scanned photo album page of FIG. 4.
Figure 8:
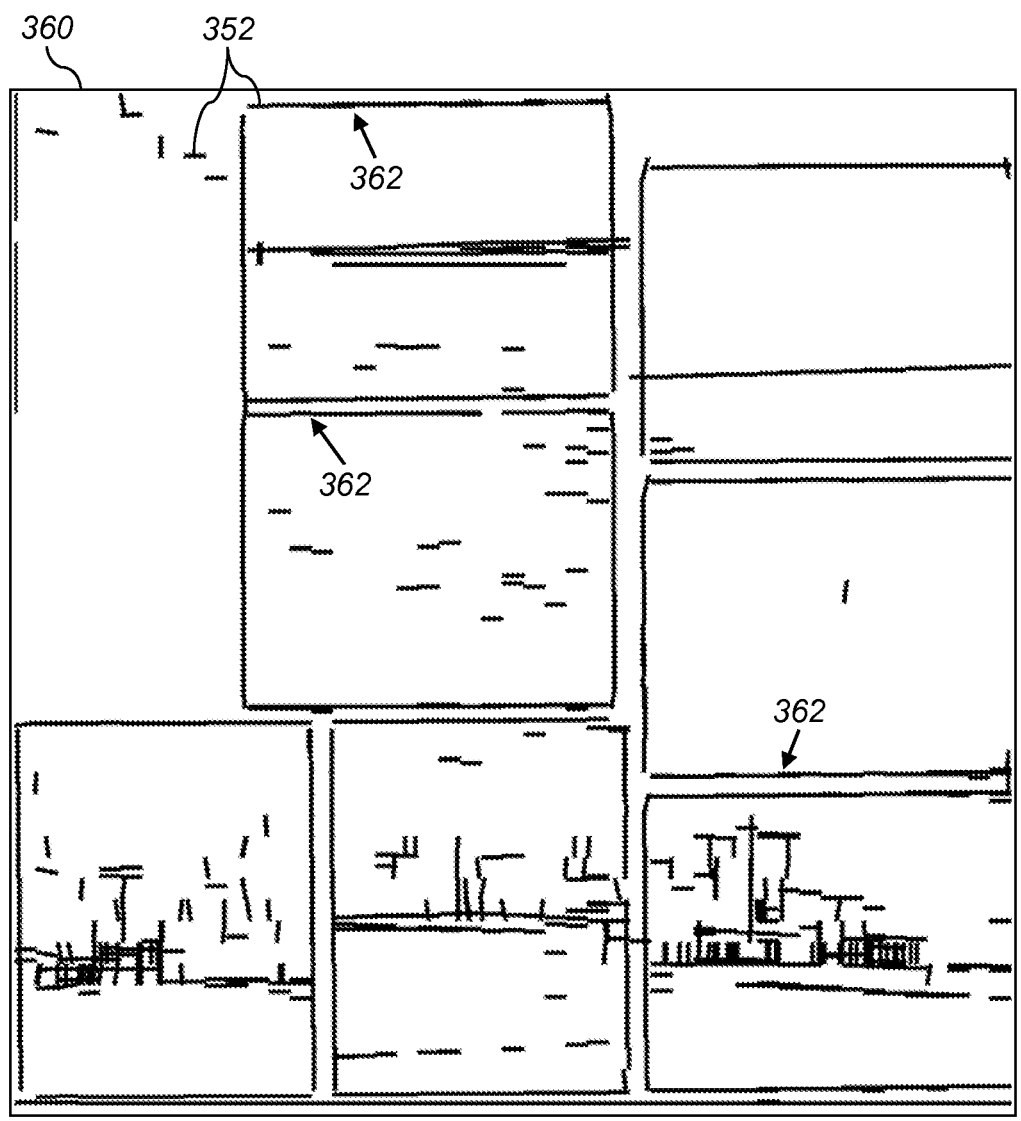

FIG. 7 shows a line segment image 350 showing a set of line segments 352 determined from the horizontal gradient image 330 of FIG. 5 and the vertical gradient image 340 of FIG. 6. The line segments 352 were determined using the Hough transform approach. A tile grid 354 showing the image tiles is overlaid on line segment image 350 to show the relationship between the line segments and the tile. FIG. 8 shows a line segment image 360 showing the line segments 352 without the overlaid tile grid.

While FIG. 8 shows a line segment image 360, it should be noted that such an image is never created according to the preferred embodiment. Rather parameters representing the geometry of the line segments are stored as data objects in a data structure. Each of these data objects contains sufficient information to completely reconstruct the location and orientation of the line segment in the image. In a preferred embodiment each data object stores the projection direction (horizontal or vertical), the slope, the intercept, the starting point and the ending point for a line segment. From this stage on, the remaining processing steps needed to identify the enclosing rectangles for each of the individual images in the composite image 200 (FIG. 2) works primarily with the stored data structure rather than the image pixel data.

The edges of the individual images in the composite image 200 are obviously larger than tile size (e.g., ¼ inch). Therefore, the next phase of processing is to use a combine line segments step 215 to combine the tile-size line segments together into longer line segments. In a preferred embodiment, the line segments are joined wherever they meet end-to-end and are lined up along the same slope. A close examination of FIG. 8 shows that some of the line segments that comprise an edge of one of the individual images are not perfectly co-linear. (For example, see misaligned line segments 362). Consequently, a tolerance must be applied when two line segments meet end-to-end, and whether they are at the same angle.

The precision that the angles of the line segments can be determined within the image tiles is relatively coarse, due to their small size and the need to minimize the number of projection angles that are evaluated (to minimize processing time). In a preferred embodiment, two line segments are deemed to have the same angle if they are equal to within an angular tolerance of 5°. However other embodiments may use smaller or larger angular tolerances (particularly if the number of different projection angles are evaluated). A position tolerance is also defined for determining whether two line segments meet end-to-end. In a preferred embodiment, two line segments are deemed to meet end-to-end if the spatial locations of the endpoints to are equal to within a spatial tolerance of 5 pixels (0.5 inches). In some embodiments, the line segment merging process can be applied iteratively to test whether any of the merged line segments should be merged further. The iterative process can be repeated until no additional line segments are merged.

Once it is decided that two (or more) line segments are adjacent portions of a longer line, the line segments are merged. In one implementation merging is done by fitting a new line to a set of points along each line segment. This essentially averages the geometry of the individual line segments together. By doing this, the accuracy of the angle improves as the merged segments get longer. The point averaging along each line segment does not refer back to the images pixel data; it only refers to the data structures representing the line segments. In other embodiments, the slope and intercept of the merged line segment can be determined directly by averaging the slopes and intercepts of the line segments being merged.

Figure 9:
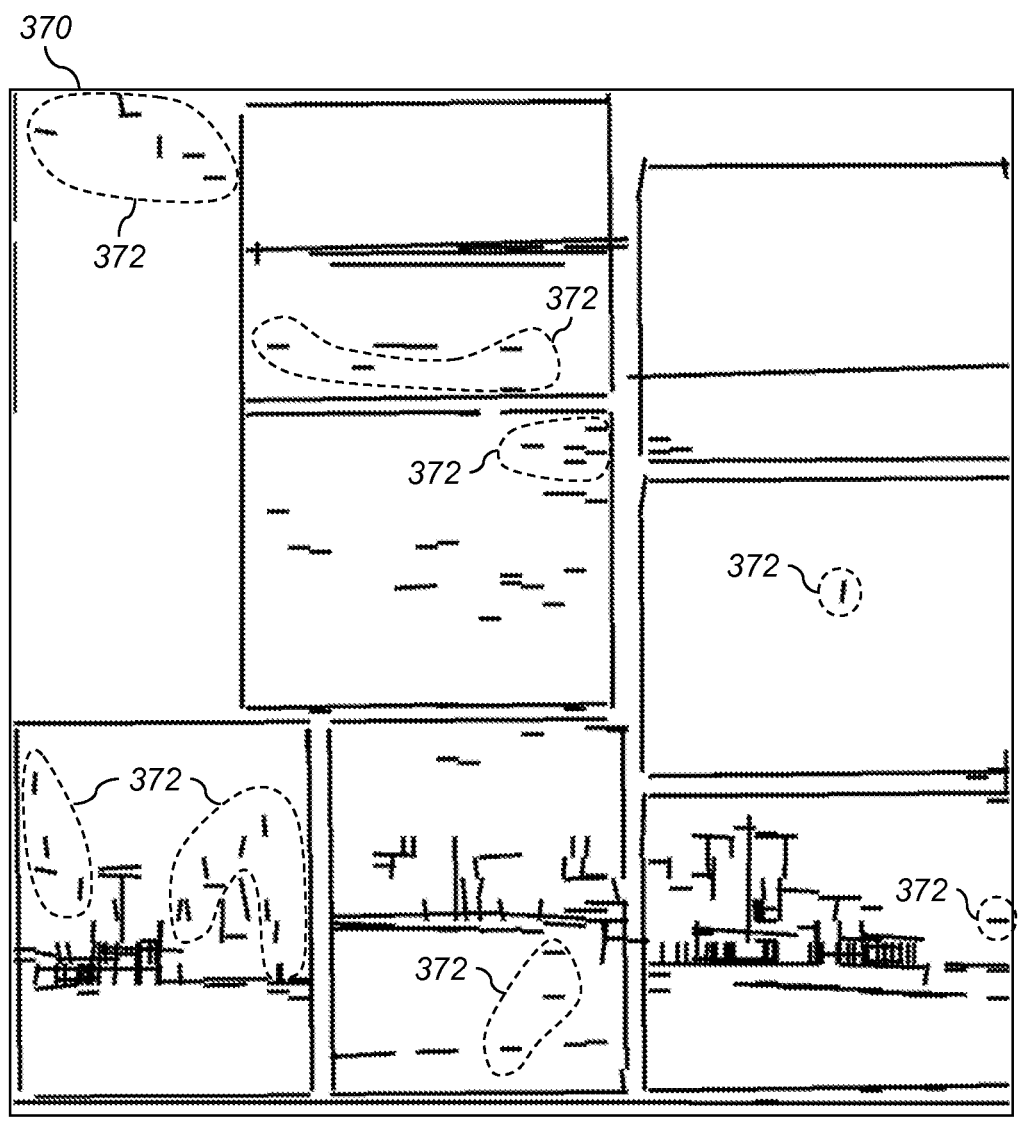
FIG. 9 shows a merged line segment image corresponding to the cropped scanned photo album page of FIG. 4.

FIG. 9 shows a merged line segment image 370 illustrating the resulting set of merged line segments after a first pass of applying the combine line segments step 215 (FIG. 2) to the line segments in the line segment image 360 of FIG. 8. The merged line segment image 370 includes many short line segments 372. These single tile line segments generally correspond to interior content of the individual images, or to noise. A discard short line segments step 220 is used to discard all line segments that are less than a predefined minimum length. In a preferred embodiment, the minimum length is ½ inch so that line segments that span only a single image tile are discarded.

Figure 10:
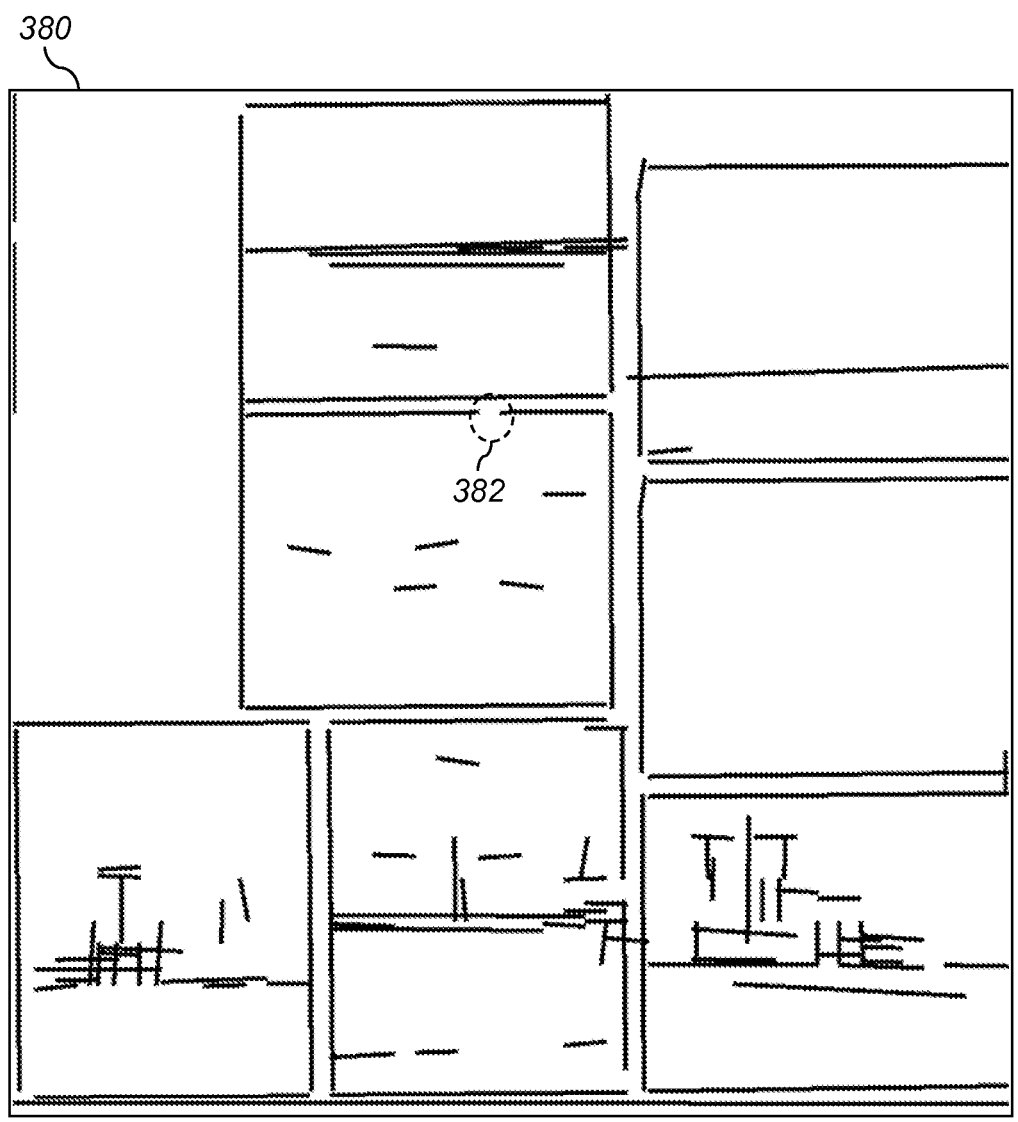
FIG. 10 shows a long line segment image corresponding to the cropped scanned photo album page of FIG. 4.

FIG. 10 shows a long line segment image 380 determined by applying the combine line segments step 215 to the line segments in the merged line segment image 370 of FIG. 9. Many such short line segments have been removed, including the short line segments 372 that were indicated in FIG. 9.

In some embodiments, the combine line segments step 210 (FIG. 2) and the discard short line segments step 220 (FIG. 2) are applied iteratively, possibly with different predefined combinations of values for the tolerances applied to segment alignment and angle. During the first application of the combine line segments step 210, the averaging of multiple short segments improves the angle accuracy, as well as the "cross-axis" location accuracy of the line segments. As a result, a second pass of the combine line segments step 210 can yield further concatenation of the medium length line segments. This can then be followed by a second iteration of the discard short line segments step 220. In this second pass, a longer minimum length can be used (e.g., ¾ inch). The results represent every long (greater than ¾ inch) straight edge in the image, and will be referred to as the long segment list.

Figure 11:
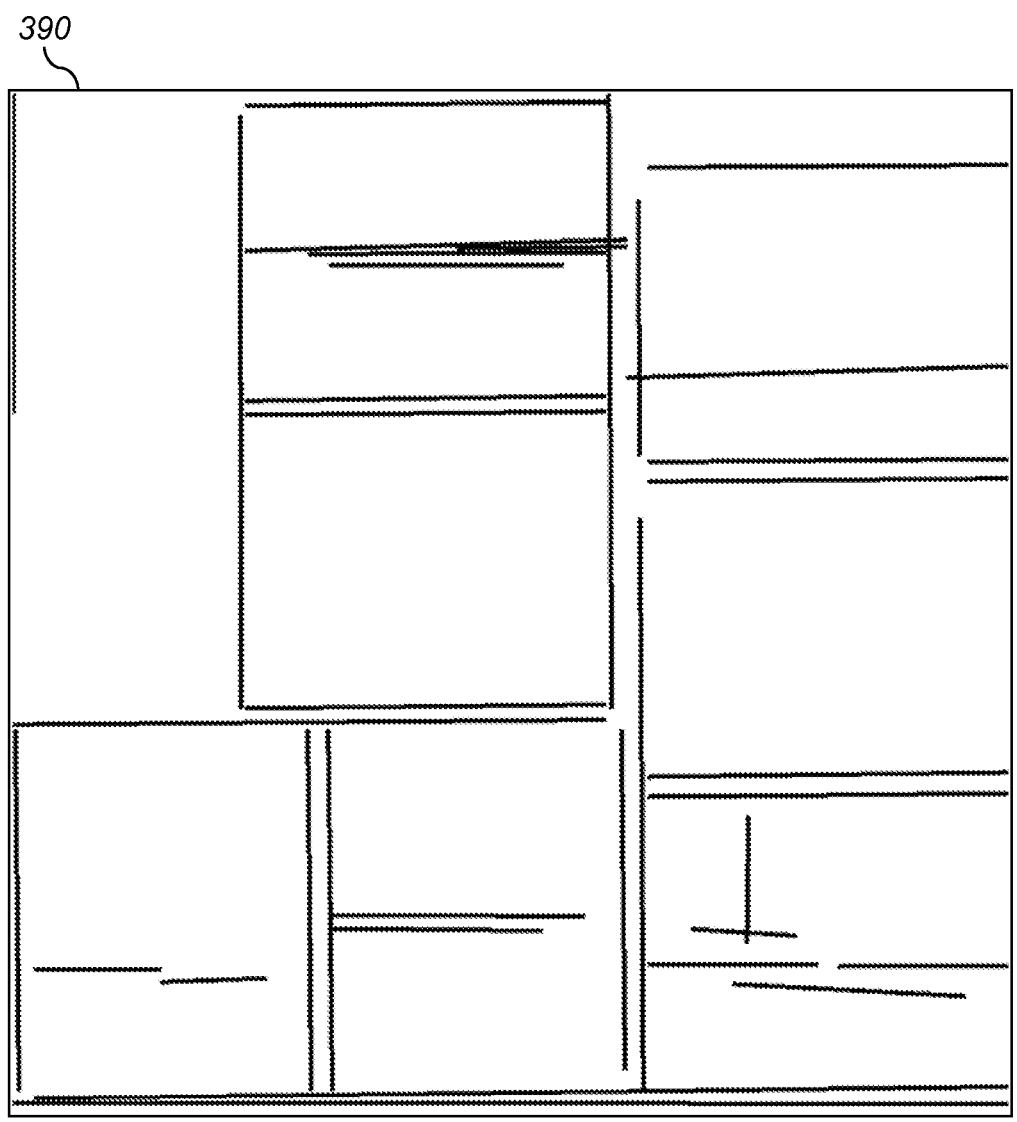
FIG. 11 shows a final line segment image corresponding to the cropped scanned photo album page of FIG. 4.

In some embodiments, a third iteration of the combine line segments step 215 is performed, this time merging lines that are separated by a small gap that is less than a predefined gap tolerance. This approach can be used to merge two line segments that are collinear, but do not extend all the way up to one another (i.e., they have a gap between them). (An example of a gap 382 of this kind is shown in FIG. 10.) In a preferred embodiment a gap tolerance of ¼ inch is used, corresponding to the size of a single image tile. The results of this gap covering merge are illustrated in FIG. 11 which shows a final line segment image 390. It can be seen that the gap 382 shown in FIG. 10 has been closed.

At this point, four additional segments that form the perimeter of the entire original image are added. These artificial edges can provide boundaries for photographs that extend all the way to the page edge. The resulting list of line segments is stored as the final line segment list. The long line segment list and the final line segment list are retained as line segments 225.

Next a define candidate rectangles step 230 is used to assemble the line segments 225 into a set of candidate rectangles 235. In a preferred embodiment, the define candidate rectangles step 230 exhaustively iterates through every possible combination of two horizontal and two vertical edges taken from the final line segment list. For each combination, the angles of the line segments are compared. If the angles of the line segments are not within a predefined tolerance of being parallel or perpendicular to each other, that combination of line segments is discarded.

One weakness of this approach is that a photograph that extends off the edge can only be located if its edges are fairly square with the perimeter of the composite image, otherwise the skew angle of the edges for the rest of the photograph will not match the artificial perimeter edge, and therefore the rectangle will be rejected. In some embodiments, a larger tolerance can be applied for combination of line segments that include an edge of the composite image 200 to compensate for this situation.

Figure 12:
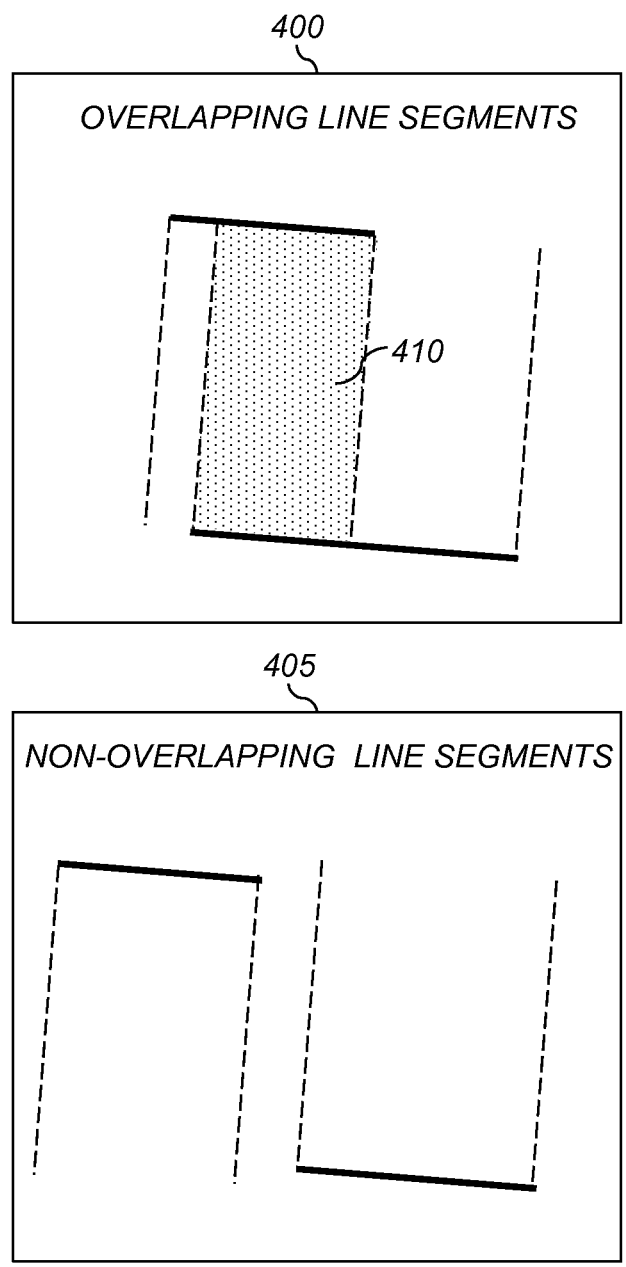
FIG. 12 illustrates a method for determining whether two line segments overlap.

An additional requirement is that the horizontal line segments in a candidate combination of line segments are required to overlap. This is illustrated in FIG. 12 which shows a pair of overlapping line segments 400 and a pair of non-overlapping line segments 405. Two line segments are said to overlap if they share at least some common range 410, over their extent along an axis parallel to the line segments. Similarly, the vertical line segments are also required to overlap. Only combinations of line segments where both the horizontal and vertical line segments overlap are retained for forming the candidate rectangles 235 (FIG. 2).

Figure 13:
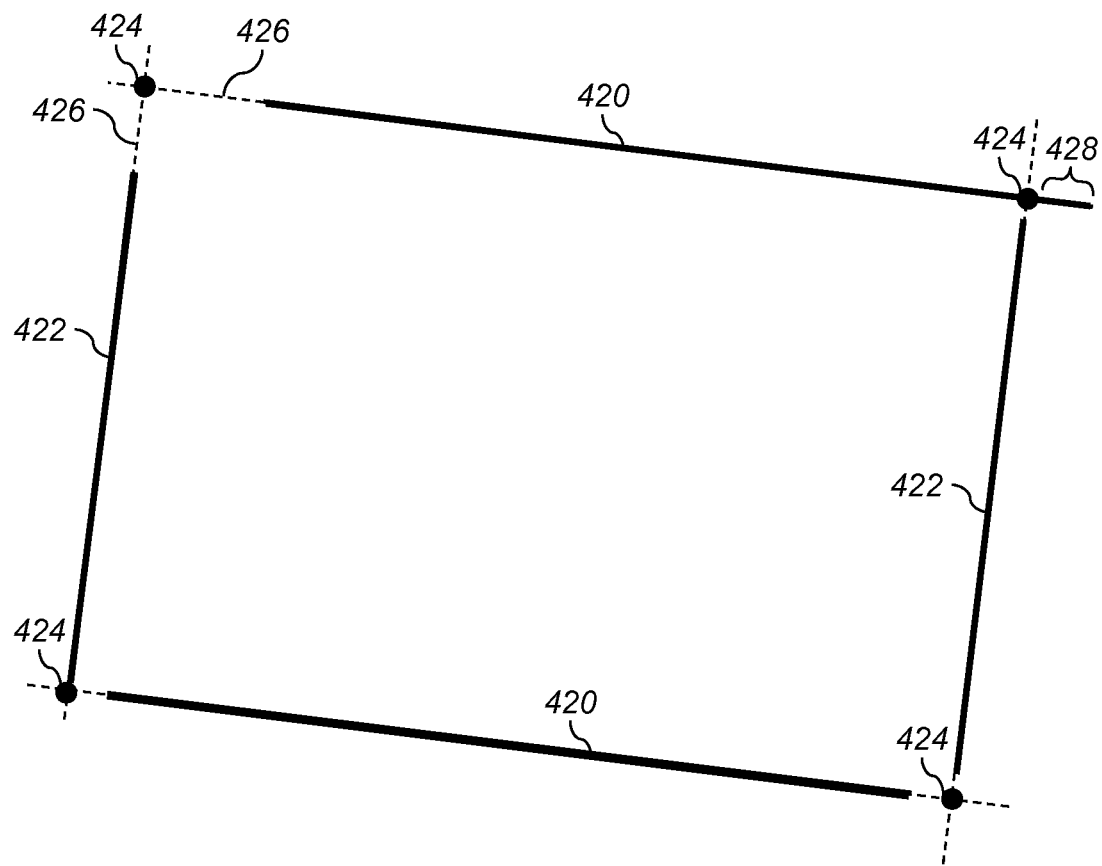
FIG. 13 illustrates the determination of corner points for a rectangle from a set of line segments.

Next, the intersections of the vertical line segments and the horizontal line segments in a candidate combination of line segments are determined to determine the corner points of a candidate rectangle 235. FIG. 13 illustrates the determination of corner points 424 from a pair of horizontal line segments 420 and a pair of vertical line segments 422. The coordinates of the corner points 424 are found by determining the intersection of extended lines corresponding to one of the horizontal line segments and one of the vertical line segments. As illustrated by the upper left corner point 424 in FIG. 13, the determined corner points 424 do not necessarily fall on any of the horizontal line segments 420 or vertical line segments 422, but may lie on extrapolated segments 426.

A set of geometric constraints can be applied to further prune the list of candidate rectangles 235 (FIG. 2). In a preferred embodiment, each side of a candidate rectangle 235 is required to exceed a minimum length (e.g. 1 inch), and the area of a candidate rectangle 235 is required to exceed a minimum area (e.g., 1.5 square inches). Any candidate rectangle 235 that does not meet these requirements is discarded.

Additional geometric constraints are also applied that are based on criteria related to percent coverage, maximum gap and over-extension characteristics. These criteria are all based on computations using the long line segment list. Given the four corner points for each candidate rectangle 235, the algorithm for applying these criteria iterates along each of the edges and to compute the three characteristics.

The percent coverage characteristic is the fraction of the candidate rectangle's edge that is directly on top of one of the line segments in the long line segment list (within a tolerance). In a preferred embodiment, if the percent coverage of each side is greater than 60%, and the total percent coverage of the rectangle as a whole is greater than 70%, then the candidate rectangle 235 is kept, otherwise it is discarded.

The maximum gap characteristic is the longest extent of one of the candidate rectangle's edges that is not directly on top of a line segment in the long line segment list. In a preferred embodiment, if the maximum gap is less than 1 inch, then the candidate rectangle 235 is kept, otherwise it is discarded.

The over-extension characteristic relates to whether a line segment extends beyond the corner of the rectangle (see over-extended line segment portion 428 in FIG. 13). A Boolean over-extension value is computed by examining the distance each line segment extends beyond the corner of the candidate rectangle. If that distance exceeds a predefined threshold, the edge is considered to be overextended, otherwise it is not overextended. In a preferred embodiment, the threshold for considering an edge overextended is defined as the dimension of a single tile used in the locate candidate line segment step 210. This choice of threshold ensures that line segments which simply end in the same tile as the rectangle corner will not be considered overextended. The computed over-extension value is not utilized immediately, but retained for use later on.

Figure 14:
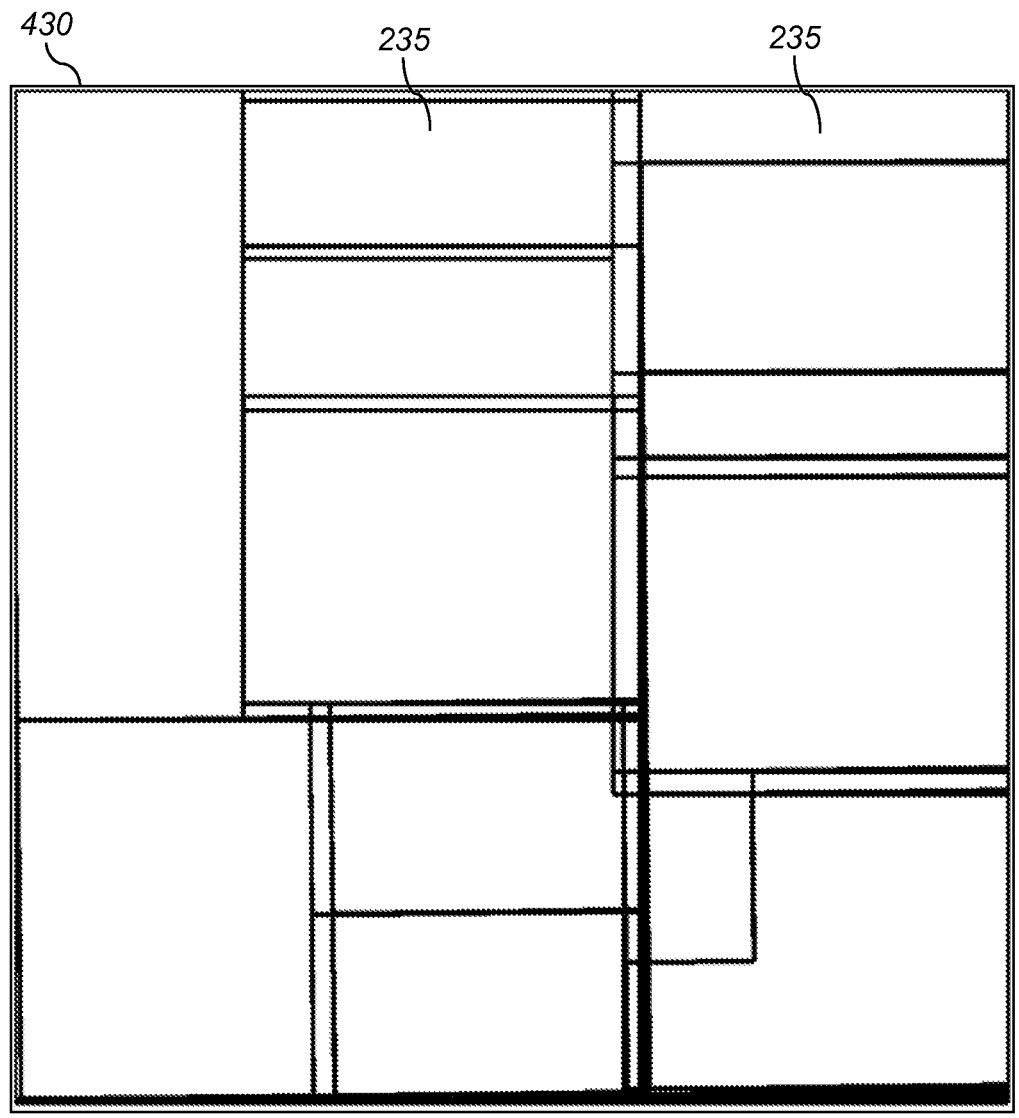
FIG. 14 shows a candidate rectangle image corresponding to the cropped scanned photo album page of FIG. 4.

All of the candidate rectangles 235 that meet the aforementioned criteria are formed into a candidate rectangle list. FIG. 14 shows a candidate rectangle image 430 showing the set of candidate rectangles 235 determined from the line segments of FIG. 11. (It is difficult to discern individual candidate rectangles 235 in the candidate rectangle image 430 since many of them overlap and share common edges.)

Generally speaking, many of the candidate rectangles 235 in the candidate rectangle list are not outlines for the individual images 305 of FIG. 3. Some may include edges of adjacent photos, multiple photos, or interior content. For example, there are many candidate rectangles 235 illustrated in FIG. 14, but only seven of them correspond to one of the individual images 305. The correct seven are present, but there are also a lot of others that must be eliminated.

Returning to a discussion of FIG. 2, an identify empty image regions step 240 is now used to identify a set of empty image regions 245. The identify empty regions step 240 locates relatively large vacant regions in the midst of these rectangles. In one embodiment, the empty image regions 245 are defined to be those image regions that are more than a predefined isolation distance from any line segment 225 in the final line segment list. In an example embodiment, an isolation distance of ½ inch is used, however other isolation distances (e.g., ¼ inch or 1 inch) can also be used in accordance with the present invention. In a preferred embodiment, the empty image regions 245 are located by iterating over the entire image area on a regular (e.g., ¼ inch) grid. The distance of each grid point to the closest line segment 225 is computed. In another embodiment, the distance of each grid point to the nearest candidate rectangle 235 edge is computed. If that distance exceeds the predefined isolation distance, the point is considered "isolated". The term "isolated" is used here to mean "not next to any line segment (or rectangle edge)." That is, isolated points are not isolated relative to each other, but rather from the line segments. The isolated points are collected into groups to form the empty image regions 245. A list of groups is maintained. As each new isolated point is identified, it is assigned to the first group that already contains any point within a predefined group distance (e.g., ½ inch) of the new point. If no previously defined group is within the predefined group distance of the newly found isolated point, then a new group is created. The result is a list of groups of grid points, each group corresponding to an empty image region 245. Next, the coordinates of all the grid points in each group are averaged to determine a centroid location for that group. Each centroid corresponds to the approximate center of mass of the corresponding empty image region 245. The locations of empty image regions 245 are characterized by these centroids.

Figure 15:
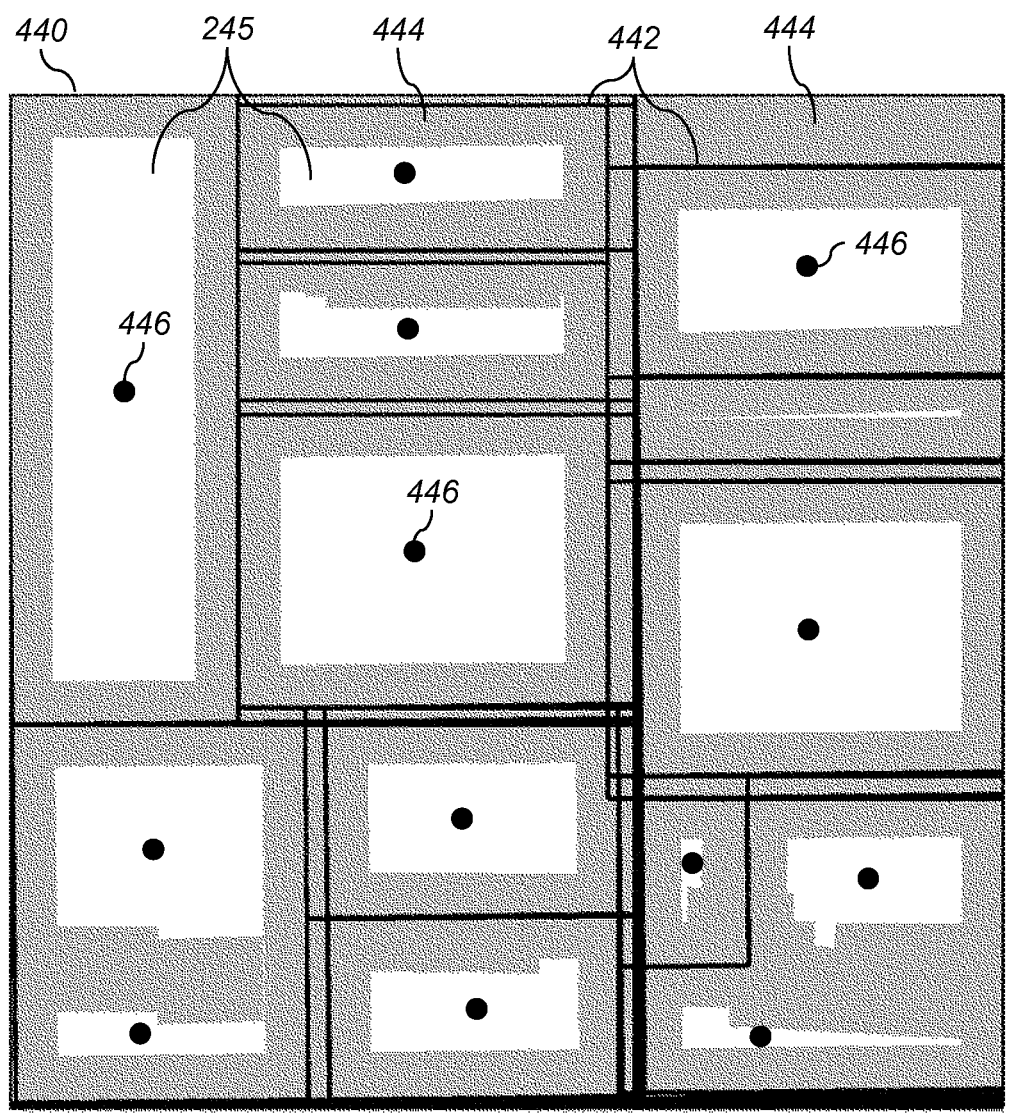
FIG. 15 shows an empty image region image corresponding to the cropped scanned photo album page of FIG. 4.
Figure 16:
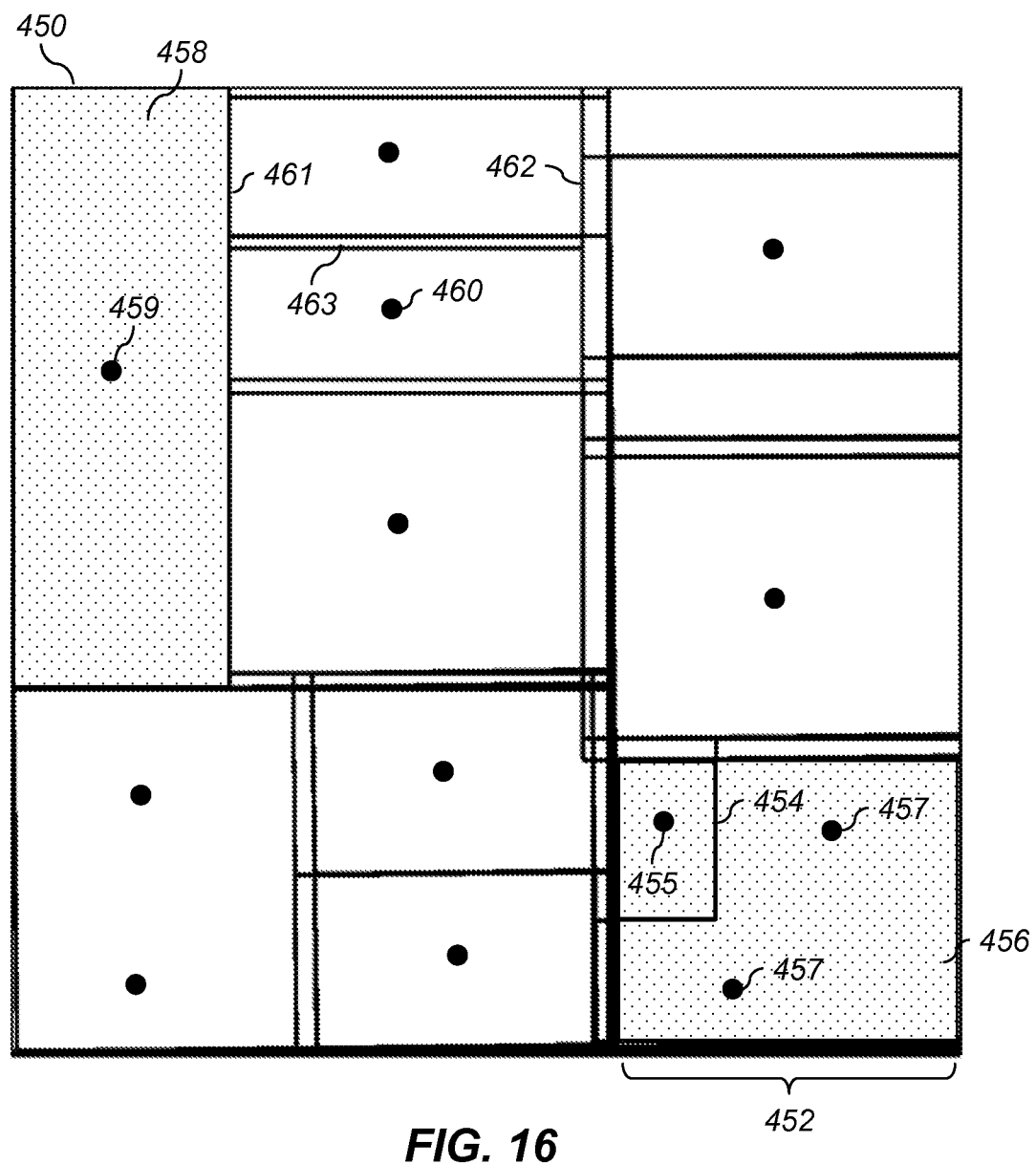
FIG. 16 shows a centroid image corresponding to the cropped scanned photo album page of FIG. 4.

FIG. 15 shows an empty image region image 440 corresponding to the final line segment image 390 of FIG. 11. The black lines represent rectangle edges 442 for the candidate rectangles 235. The gray image regions 444 are those image regions that are within ½ inch of a line segment in the final line segment image 390 (FIG. 11). The white image regions show the resulting empty image regions 245, and the black dots represent the centroids 446 for each of the empty regions 245. FIG. 16 shows a centroid image 450 corresponding to the empty image region image 440 where the gray image regions 444 have been eliminated for clarity.

Once the centroids for the empty image regions 245 have been located, the next objective of the algorithm is to select the best possible rectangle from the set of candidate rectangles 235 that encloses each centroid. Generally, the smallest candidate rectangle that encloses a particular centroid is the correct rectangle, but there are exceptions. Such exceptions occur when a particular individual image contains interior features that are seen as horizontal or vertical lines parallel to the edges of the photograph. For example, a horizon, the edge of a wall, or a tall straight tree trunk can produce such a line. These interior lines can result in subdividing the image region corresponding to the particular individual image into two or more rectangles, each of which can contain one or more centroids. This is illustrated by the subdivided individual image 452 in the lower right corner of FIG. 16. In this example, the subdivided individual image 452 contains an interior rectangle 454 enclosing one centroid 455. The image region corresponding to the subdivided individual image 452 also includes an outer region 456 containing two additional centroids 457.

Another situation where the smallest rectangle that encloses a centroid does not correspond to an individual image occurs when a large region of blank background area exists. This is illustrated by the background region 458 in the upper left of FIG. 16. The centroid 459 located in the background region 458 can only be enclosed with a rectangle that has the left and top edges at the perimeter of the album image. The right and bottom edges are made up of the edges of multiple photographs. (Since the background region 458 has a high aspect ratio, the smallest enclosing rectangle turns out to enclose the top-left two photographs, as well as the background region 458.) This is clearly not a desired result.

The rectangle selection process, while primarily utilizing the smallest rectangle, seeks to avoid these problem situations by applying the following steps. First, an identify enclosing rectangles step 250 (FIG. 2) is used to identify a set of enclosing rectangles for each centroid. This is done by testing each of the candidate rectangles 235 to determine whether they enclose each of the centroids.

Next, a select enclosing rectangles step 255 is used to select a set of selected rectangles 260 by applying a series of geometrical constraints. For each centroid, the enclosing rectangles are sorted into order of area, from smallest to largest. The first (smallest) rectangle is initially chosen as an initial guess for the best rectangle.

In FIG. 16, the smallest enclosing rectangle for centroid 460 would cut the photograph in two at the horizon. But, it can be seen that the vertical line segments 461 and 462, which make up the vertical sides of the enclosing rectangles, extend beyond the horizon line 463. This means they are "over-extended" as was discussed earlier.

When the smallest rectangle is not over-extended in any direction, then the selection process for that centroid is complete and the smallest rectangle is kept as one of the selected rectangles 260 (at least for now). However, if the smallest rectangle is over-extended, the algorithm continues examining successively larger enclosing rectangles to identify a more appropriate rectangle by applying a set of geometric constraints. A first constraint is that the enclosing rectangle should not be over-extended in any direction. A second constraint is that the candidate rectangle must share sides with the smallest enclosing rectangle on all edges except the one that is between the two over-extended edges. This critical side of the smallest enclosing rectangle is the only one that is potentially misidentified, so the larger candidate must only be larger in terms of the position of the one edge. Any of the larger enclosing rectangles that are not the same on the other three sides are eliminated immediately. The enclosing rectangles that are larger only in the one, correct, overextended direction are considered further.

Figures 17A, 17B, 17C:
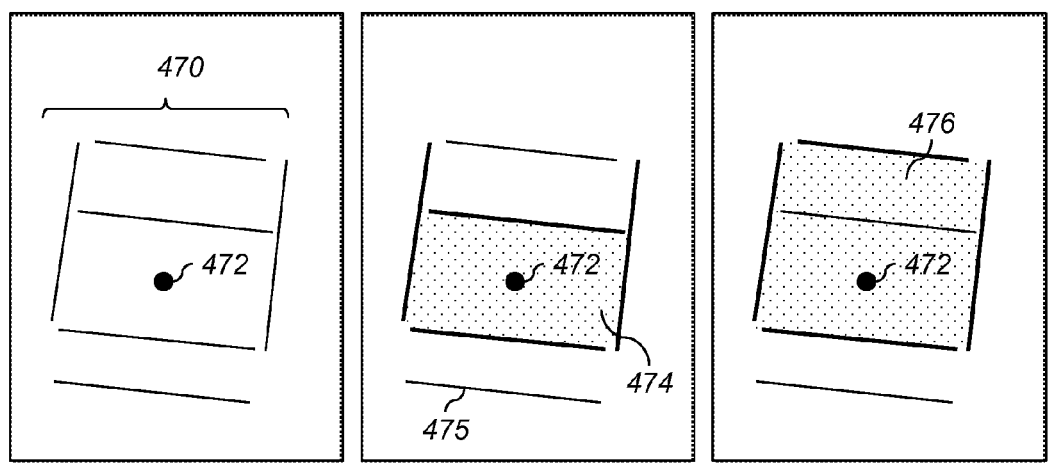
FIGS. 17A-17C illustrate the application of an over-extension geometric constraint to select an enclosing rectangle.

To clarify, consider FIG. 17A. A set of line segments 470 encloses a single centroid 472. The smallest enclosing rectangle 474 shown in FIG. 17B is overextended only at the top edge. Thus, the bottommost line segment 475 cannot be used to form a larger rectangle, because it would extend in the downward direction. FIG. 17C shows a candidate enclosing rectangle 476, which is a valid candidate because it shares the left, right and lower edges with the smallest enclosing rectangle 474 of FIG. 17B.

Each of the valid candidate enclosing rectangles that satisfy the preceding criterion is assigned a rectangle quality metric. The rectangle quality metric can be determined using a variety of different methods. In a preferred embodiment, the rectangle quality metric is determined based on two factors: an edge coverage quality factor $Q_E$ and an aspect ratio quality factor $Q_A$. The edge coverage quality factor is based on a coverage percentage corresponding to the percent of the periphery of the rectangle that falls directly on top of an edge line segment in the original image (within a tolerance), and on the accuracy of an average skew angle for the enclosing rectangle compared to the skew angles individual line segments that make up the edges. (The coverage percentage was actually computed earlier during the construction of rectangles from line segments.) A skew angle error parameter $E_a$ is determined by first determining the average skew angle for the enclosing rectangle. Each of the line segments that make up the enclosing rectangle has an associated skew angle with respect to the corresponding horizontal or vertical direction. These skew angles are averaged to determine the average skew angle for the enclosing rectangle. The skew angles for each of the line segments can then be compared to the average skew angle to determine a corresponding skew angle error. The average of the skew angle errors is then computed to determine an average skew angle error. This value is divided by a predefined maximum allowable skew angle error (e.g., 2°) to determine the skew angle error parameter $E_a$. The coverage percentage (represented by Cp) is combined with the skew angle error parameter $E_a$ to determine the edge coverage quality factor $Q_E$ according to the following table, which seeks to reduce the value of the edge coverage quality factor $Q_E$ for angles that fit poorly.

| $E_a$ | $Q_E$ |
|---|---|
| 0.0-0.5 | Cp × 1.0 |
| 0.5-0.6 | Cp × 0.9 |
| 0.6-0.7 | Cp × 0.8 |
| 0.7-0.8 | Cp × 0.7 |
| 0.8 and up | Cp × 0.6 |

The aspect ratio quality factor $Q_A$ is designed to give preference to candidate rectangle shapes that are more likely to be photographs. An aspect ratio for a candidate rectangle is determined by computing a ratio of the longer dimension to the smaller dimension so that the aspect ratios are always greater than 1.0. The aspect ratio quality factor $Q_A$ is assigned as follows

| Aspect Ratio | $Q_A$ |
|---|---|
| 1.0-1.2 | 0.94 |
| 1.2-1.3 | 0.95 |
| 1.3-1.4 | 0.96 |
| 1.4-1.5 | 0.98 |
| 1.5-1.7 | 1.0 |
| 1.7-1.9 | 0.9 |
| 1.9-2.2 | 0.7 |
| 2.2 and up | 0.5 |

The edge coverage quality factor $Q_E$ and an aspect ratio quality factor $Q_A$ are multiplied together to determine the corresponding rectangle quality metric. If the rectangle quality metric for a larger candidate rectangle is greater than the rectangle quality metric for the smallest enclosing rectangle, then the larger candidate rectangle is considered to be the better choice and is kept.

This process of identifying a single optimal enclosing rectangle is repeated for each centroid. A "centroid enclosing rectangle list", consisting of one enclosing rectangle for each centroid is accumulated as the output for this stage in the algorithm.

The algorithm described thus far does a good job of selecting the best enclosing rectangle surrounding each centroid, but often there are multiple centroids found within a single individual image. As was discussed earlier, multiple centroids within a single individual image occur when interior content in the image contains long straight edges. These subdivide the image and result in multiple rectangles being generated for a single image.

Another situation where an excess rectangle can be produced was described with reference to FIG. 16, where a background region 458 resulted the image regions for multiple photos being included in a single larger rectangle.

Both of these problems result in the centroid enclosing rectangle list including rectangles that overlap. Hence, additional geometrical constraints need to be employed to eliminate these problems. The first step is to identify pairs of rectangles that have a large overlap. Then each pair is considered to determine which one to keep, and which to discard. Unfortunately, the two sources of overlapping rectangles require different selection criteria. When a photo has been subdivided, it typically produces a larger rectangle corresponding to the whole photo that encloses another one (or more) additional smaller rectangles that enclose subdivided regions of the photo. In this case, the larger enclosing rectangle is the correct one to keep. Conversely, when a border region centroid has been enclosed by a rectangle that also encloses a genuine photo, the smaller enclosing rectangle is the correct one to keep, and the larger enclosing rectangle should be discarded.

Figure 18:
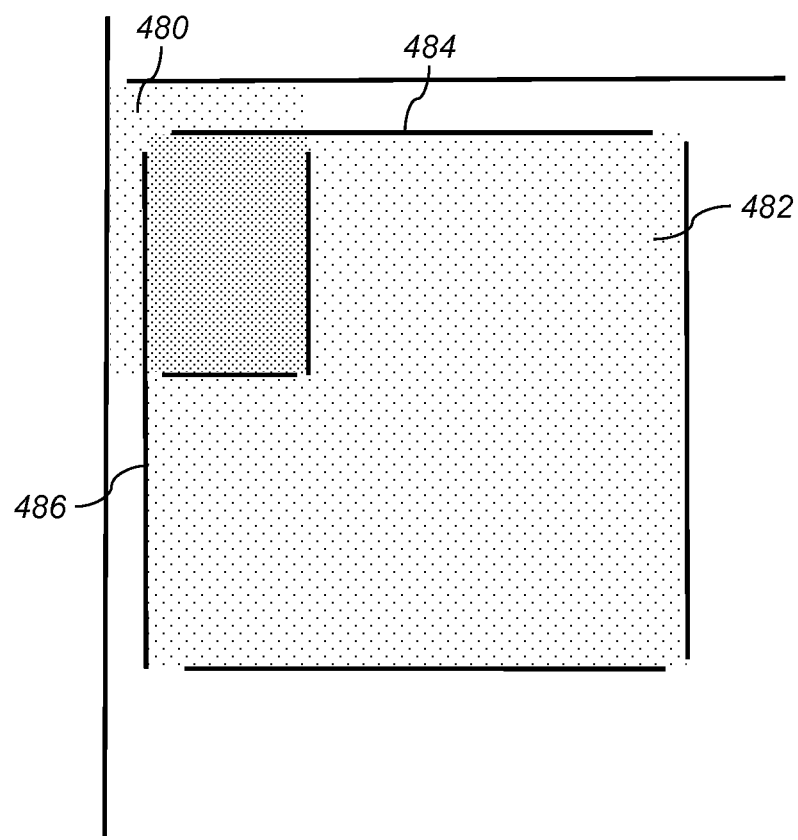
FIG. 18 illustrates the application of an edge cut geometric constraint to choose between overlapping rectangles.

Because of this contradiction, other factors must be considered to distinguish which of the enclosing rectangles to keep. A method for determining which enclosing rectangles to keep according to a preferred embodiment will now be described with respect to the example illustrated in FIG. 18, which involves a smaller rectangle 480 overlaps a larger rectangle 482. (This example is similar to the situation which occurs in the lower right corner of FIG. 16.) The method is based on counting rectangle edge cuts. Rectangle edge cuts are positions along the periphery of a rectangle where another line segments intersects the edge of the rectangle. In this case, line segments 484 and 486 pass through the edges of the smaller rectangle 480, and therefore constitute two edge cuts. However, no line segments pass through the edges of the larger rectangle 482. The presence of edge cuts through an enclosing rectangle is generally an indication that the enclosing rectangle does not correspond to the boundaries of a photograph, because in a true photograph, no straight lines in the photograph will extend beyond its boundaries into the exterior area. Edge cuts typically are produced when a photograph is subdivided by interior content, but not when a larger spurious rectangle (e.g., from a border centroid) encloses a genuine photograph. According to a preferred embodiment, the numbers of edge cuts in the two rectangles are compared. If the smaller rectangle has more edge cuts it is discarded. Otherwise, the larger rectangle is discarded.

Figure 19:
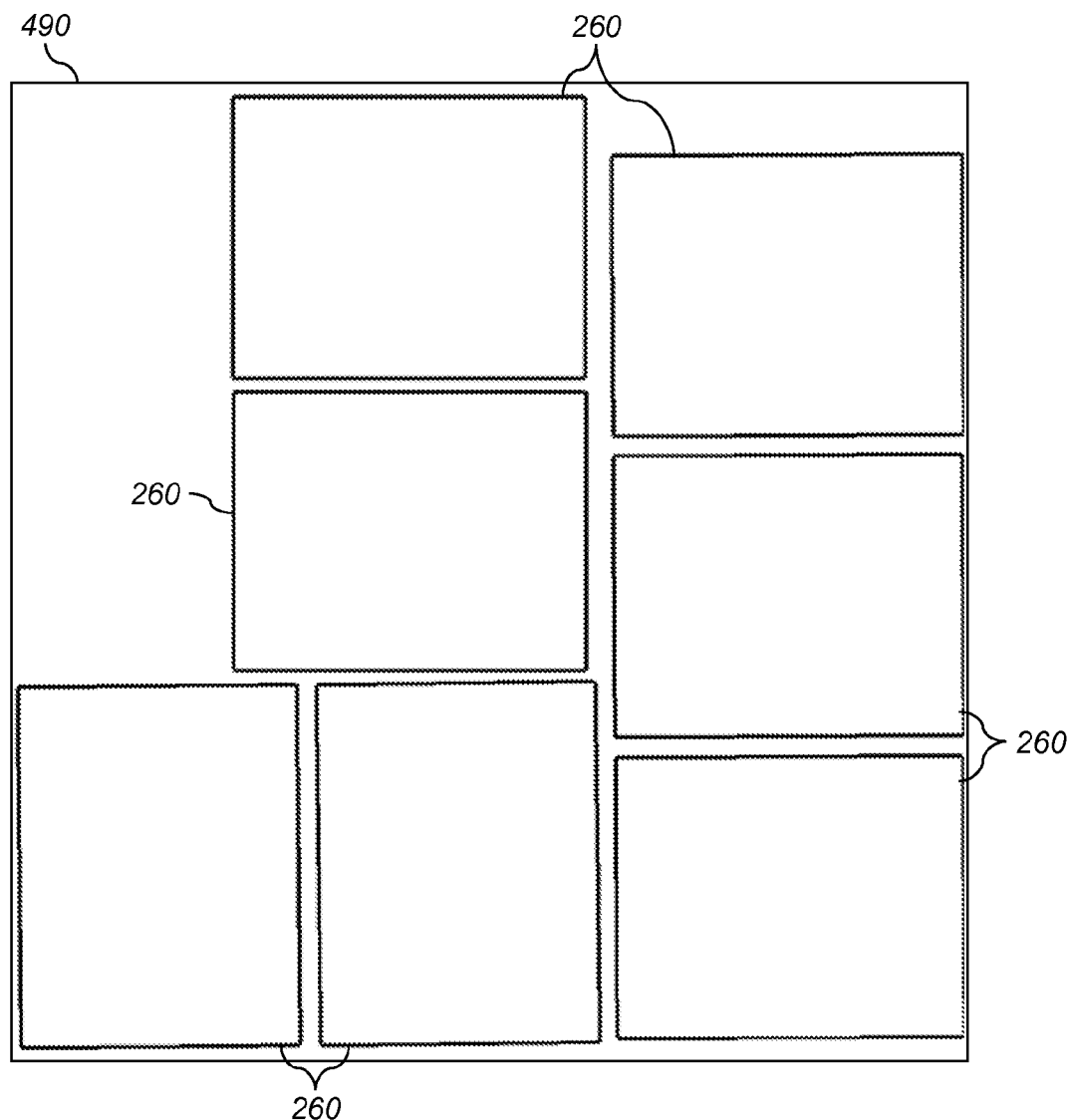
FIG. 19 shows a selected rectangles image corresponding to the cropped scanned photo album page of FIG. 4.

FIG. 19 shows a selected rectangles image 490 that illustrates the selected rectangles 260 that were determined by applying the above described geometric constraints to the candidate rectangles determined for the centroid image 450 of FIG. 16. Comparing the selected rectangles image 490 to the cropped scanned photo album page 320 in FIG. 4, it can be seen that the set of selected rectangles 260 in FIG. 19 are a good match to the positions of the individual images 305 in FIG. 4.

Returning to a discussion of FIG. 2, once the selected rectangles 260 have been determined, an extract sub-images step 265 is used to extract a set of corresponding sub-images 270 from the composite image 200. A store sub-images step 275 is then used to stored the sub-images 270 in a processor-accessible memory. In a preferred embodiment, each sub-image 270 is stored in its own digital image file. The digital image file can be stored using any digital image file format known in the art (e.g., JPEG).

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

| | |
|---|---|
| 110 | data processing system |
| 120 | peripheral system |
| 130 | user interface system |
| 140 | data storage system |
| 200 | composite image |
| 205 | subdivide image into tiles step |
| 210 | locate candidate line segments step |
| 215 | combine line segments step |
| 220 | discard short line segments step |
| 225 | line segments |
| 230 | define candidate rectangles step |
| 235 | candidate rectangles |
| 240 | identify empty image regions step |
| 245 | empty image regions |
| 250 | identify enclosing rectangles step |
| 255 | select enclosing rectangles step |
| 260 | selected rectangles |
| 265 | extract sub-images step |
| 270 | sub-images |
| 275 | store sub-images step |
| 300 | scanned photo album page |
| 305 | individual images |
| 310 | border region |
| 320 | cropped scanned photo album page |
| 330 | horizontal gradient image |
| 340 | vertical gradient image |
| 350 | line segment image |
| 352 | line segments |
| 354 | tile grid |
| 360 | line segment image |
| 362 | misaligned line segments |
| 370 | merged line segment image |
| 372 | short line segments |
| 380 | long line segment image |
| 382 | gap |
| 390 | final line segment image |
| 400 | overlapping line segments |
| 405 | non-overlapping line segments |
| 410 | common range |
| 420 | horizontal line segment |
| 422 | vertical line segment |
| 424 | corner point |
| 426 | extrapolated segments |
| 428 | over-extended line segment portion |
| 430 | candidate rectangle image |
| 440 | empty image region image |
| 442 | rectangle edges |
| 444 | image regions |
| 446 | centroids |
| 450 | centroid image |
| 452 | subdivided individual image |
| 454 | interior rectangle |
| 455 | centroid |
| 456 | outer region |
| 457 | centroids |
| 458 | background region |
| 459 | centroid |
| 460 | centroid |
| 461 | line segment |
| 462 | line segment |
| 463 | horizon line |
| 470 | line segments |
| 472 | centroid |
| 474 | smallest enclosing rectangle |
| 475 | line segment |
| 476 | candidate enclosing rectangle |
| 480 | smaller rectangle |

-continued

PARTS LIST

| | |
|---|---|
| 482 | larger rectangle |
| 484 | line segment |
| 486 | line segment |
| 490 | selected rectangles image |

The invention claimed is:

1. A method for segmenting a composite image containing a plurality of individual images, comprising:
receiving digital image data representing the composite image;
using a data processor to locate line segments corresponding to edges in the composite image;
defining a plurality of candidate rectangles by identifying sets of four line segments having a first pair of line segments that are parallel to within a predefined tolerance and a second pair of line segments that are perpendicular to the first pair of line segments to within a predefined tolerance;
identifying image regions that are more than a predefined isolation distance from any of the line segments or that are more than a predefined isolation distance from the any of the candidate rectangles;
identifying a set of enclosing rectangles from among the candidate rectangles for each of the identified image regions;
selecting a rectangle for each of the identified image regions from the corresponding set of enclosing rectangles by applying geometric constraints;
forming a plurality of sub-images from the composite image by extracting the digital image data corresponding to the selected rectangles; and
storing the sub-images in a processor-accessible memory.

2. The method of claim 1 wherein the composite image is subdivided into a plurality of image tiles and wherein the line segments are located within the image tiles.

3. The method of claim 2 further including combining short line segments having slopes and intercepts that are equal to within a predefined tolerance to form combined line segments.

4. The method of claim 3 wherein the line segments that are combined to form a particular combined line segment are separated by gaps smaller than a predefined gap tolerance.

5. The method of claim 4 wherein the predefined gap tolerance is less than or equal to the size of two image tiles.

6. The method of claim 1 further including discarding any line segments having lengths shorter than a predefined minimum length.

7. The method of claim 1 further including iteratively applying a combining step that combines short line segments having slopes and intercepts that are equal to within a predefined tolerance to form combined line segments and a discarding step that discards any line segments having lengths shorter than a predefined minimum length.

8. The method of claim 1 wherein the candidate line segments are located by applying a Hough transform to the digital image data within an image tile to determine a line segment slope and an intercept.

9. The method of claim 1 wherein the candidate line segments are located by applying a K-means classifier to the digital image data within an image tile to determine a line segment slope and an intercept.

10. The method of claim 1 wherein the sets of four combined line segments for the candidate rectangles are selected such that first pair of line segments is horizontal to within a predefined tolerance and the second pair of line segments is vertical to within a predefined tolerance.

11. The method of claim 1 wherein the isolation distance is between ¼ inch and 1 inch.

12. The method of claim 1 wherein the image regions are identified by:
   computing the distances between the combined line segments and a regular lattice of grid points to determine a set of isolated points that are more than the predefined isolation distance from any of the combined line segments; and
   grouping isolated points that are closer than a predefined group distance to define the image regions.

13. The method of claim 1 wherein the set of enclosing rectangles for a particular identified image region is identified by:
   determining a centroid for the particular identified image region; and
   identifying a set of enclosing rectangles from among the candidate rectangles that enclose the centroid.

14. The method of claim 1 wherein the geometric constraints include a minimum size constraint, a minimum area constraint, edge over-extension constraint, an edge-coverage constraint, an aspect ratio constraint or an edge cut constraint.

15. The method of claim 1 wherein if two or more of the selected rectangles overlap, one or more of the overlapping selected rectangles are eliminated by applying additional geometric constraints to form a non-overlapping set of selected rectangles.

16. The method of claim 1 wherein the sub-images correspond to the individual images in the composite image.

17. The method of claim 1 wherein the composite image is a scan of a hardcopy original.

18. The method of claim 17 wherein the hardcopy original is a photographic album page, a scrapbook page, a photo collage, a printed publication or a collection of individual images arranged on a scanner platen.

19. The method of claim 1 wherein the composite image is a digitally created composite image.

20. The method of claim 1 wherein the individual images include photographic images, artwork or computer generated images.

21. A computer program product for segmenting a composite image containing a plurality of individual images comprising a non-transitory tangible computer readable storage medium storing an executable software application for causing a data processing system to perform the steps of:
   receiving digital image data representing the composite image;
   using a data processor to locate line segments corresponding to edges in the composite image;
   defining a plurality of candidate rectangles by identifying sets of four line segments having a first pair of line segments that are parallel to within a predefined tolerance and a second pair of line segments that are perpendicular to the first pair of line segments to within a predefined tolerance;
   identifying image regions that are more than a predefined isolation distance from any of the line segments;
   identifying a set of enclosing rectangles from among the candidate rectangles for each of the identified image regions;
   selecting a rectangle for each of the identified image regions from the corresponding set of enclosing rectangles by applying geometric constraints;
   forming a plurality of sub-images from the composite image by extracting the digital image data corresponding to the selected rectangles; and
   storing the sub-images in a processor-accessible memory.

22. A system comprising:
   a data processing system; and
   a memory system communicatively connected to the data processing system and storing instructions configured to cause the data processing system to implement a method for segmenting a composite image containing a plurality of individual images, wherein the method comprises:
   receiving digital image data representing the composite image;
   using a data processor to locate line segments corresponding to edges in the composite image;
   defining a plurality of candidate rectangles by identifying sets of four line segments having a first pair of line segments that are parallel to within a predefined tolerance and a second pair of line segments that are perpendicular to the first pair of line segments to within a predefined tolerance;
   identifying image regions that are more than a predefined isolation distance from any of the line segments;
   identifying a set of enclosing rectangles from among the candidate rectangles for each of the identified image regions;
   selecting a rectangle for each of the identified image regions from the corresponding set of enclosing rectangles by applying geometric constraints;
   forming a plurality of sub-images from the composite image by extracting the digital image data corresponding to the selected rectangles; and
   storing the sub-images in a processor-accessible memory.

* * * * *